United States Patent
Ikeda et al.

(10) Patent No.: US 8,224,522 B2
(45) Date of Patent: Jul. 17, 2012

(54) DRIVING OPERATION SUPPORT DEVICE FOR A VEHICLE

(75) Inventors: Kenichi Ikeda, Richmond (CA); Hiroshi Ohmura, Hiroshima (JP); Seiji Matsumoto, Higashihiroshima (JP); Kazuhiro Hayashi, Hiroshima (JP); Hiroko Shiraishi, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 466 days.

(21) Appl. No.: 12/483,120

(22) Filed: Jun. 11, 2009

(65) Prior Publication Data
US 2009/0306852 A1 Dec. 10, 2009

(30) Foreign Application Priority Data
Jun. 17, 2008 (JP) .................................. 2008-157443

(51) Int. Cl.
*G01C 21/32* (2006.01)
*G06F 7/00* (2006.01)
(52) U.S. Cl. ................... 701/36; 701/300; 340/995.1
(58) Field of Classification Search ................ 701/36, 701/211, 300, 301; 340/995.1, 907, 5.7, 340/5.2, 435; 348/148
See application file for complete search history.

(56) References Cited

U.S. PATENT DOCUMENTS

| | | | |
|---|---|---|---|
| 2003/0147247 A1 | 8/2003 | Koike | |
| 2004/0193347 A1* | 9/2004 | Harumoto et al. | 701/45 |
| 2005/0125121 A1* | 6/2005 | Isaji et al. | 701/36 |
| 2005/0154505 A1* | 7/2005 | Nakamura et al. | 701/1 |
| 2007/0050133 A1* | 3/2007 | Yoshikawa et al. | 701/209 |
| 2007/0106475 A1* | 5/2007 | Kondoh | 701/301 |
| 2007/0124072 A1* | 5/2007 | Nakayama et al. | 701/211 |
| 2007/0225907 A1* | 9/2007 | Oonishi et al. | 701/209 |
| 2009/0187343 A1* | 7/2009 | Koch-Groeber et al. | 701/301 |

* cited by examiner

*Primary Examiner* — Tan Q Nguyen
(74) *Attorney, Agent, or Firm* — Alleman Hall McCoy Russell & Tuttle LLP

(57) ABSTRACT

A driving operation support device for a vehicle is provided herein. One exemplary driving operation support device includes a road sensor for acquiring information regarding a section of road ahead of a vehicle over which the vehicle is traveling. The driving operation support device may also include a controller for determining whether the section of road is passable for the vehicle based on the information acquired by the road sensor. The driving operation support device may further include a display provided between the section of road and a driver of the vehicle. The controller may display a guidance element on the display at a position overlapped with the section of the road as seen from the perspective of the driver, such that the guidance element indicates whether the road is passable based on the determination of the controller.

13 Claims, 19 Drawing Sheets

DRIVING OPERATION SUPPORT DEVICE FOR A VEHICLE

TECHNICAL FIELD

This invention relates to a driving operation support device that supports a driver in driving a vehicle, and generally belongs to a technical field of vehicle safety.

BACKGROUND

Various driving operation support devices that support a driver in driving a vehicle are known. For example, U.S. Patent Application Publication US2003/147247 discloses a driving operation support device which calculates "a traveling locus along which the own vehicle is estimated to travel" based on traveling speed and steering angle, etc., of a vehicle, and irradiates a visible light beam on a surface of a road based on a calculated result. Therefore, a guidance element is displayed, indicating a traveling locus that comprises left and right lines extending in a traveling direction of the vehicle on the road surface ahead of the vehicle. Such a configuration allows the vehicle driver to visually confirm that the vehicle is traveling a planned route for the vehicle.

However, in the case that the road is impassable for a vehicle due to, for example, other vehicles stopping in front of the vehicle and traffic restrictions, there arises an issue regarding how to display a guidance element on the road.

Accordingly, a purpose of this invention is to provide a driving operation support device which can support a driver in driving a vehicle depending on whether the road is passable for the vehicle.

SUMMARY

In order to solve the above issues, this invention is characterized as follows.

A first aspect of the invention is a driving operation support device for a vehicle comprising a road sensor for acquiring information regarding a section of road ahead of a vehicle over which the vehicle is traveling. The driving operation support device also includes a controller for determining whether the section of road is passable for the vehicle based on the information acquired by the road sensor. The driving operation support device also includes a display provided between the section of road and a driver of the vehicle, wherein the controller displays a guidance element on the display at a position overlapped with the section of road as seen from a perspective of the driver, the guidance element indicating whether the section of road is passable based on the determination of the controller.

According to a second aspect of the invention, the guidance element indicates that the section of road is passable when the controller has determined the section of road to be passable.

According to a third aspect of the invention, the guidance element indicates that the section of road is impassable when the controller has determined the section of road to be impassable.

A fourth aspect of the invention is a driving operation support device according to the first aspect, wherein the road sensor acquires information regarding each of a plurality of lanes of the road. Further, the controller determines whether each lane is passable for the vehicle based on the information acquired by the road sensor, and the controller causes a guidance element to be displayed in a manner that a passable lane for the vehicle is distinguishable from an impassable lane for the vehicle based on the controller determination of whether or not each lane is passable for the vehicle. According to a fifth aspect of the invention, the road sensor acquires the information regarding the road from a memory provided inside or outside the vehicle, based on a current position of the vehicle.

According to a sixth aspect of the invention, the road sensor detects that an object is present on the road ahead of the vehicle, as the information regarding the section of road.

According to a seventh aspect of the invention, the display is provided on a front windshield of the vehicle.

An eighth aspect of the invention is a driving operation support device for a vehicle comprising a road sensor for acquiring information regarding a section of road ahead of a vehicle over which the vehicle is traveling; a controller for determining whether the section of road is passable for the vehicle based on the information acquired by the road sensor; and an irradiator for irradiating a visible light beam on the road. The controller causes the irradiator to display a guidance element on the section of road by irradiating the visible light beam, the guidance element indicating whether the section of road is passable based on the determination of the controller.

A ninth aspect of the invention is the device according to the eighth aspect, wherein the guidance element displayed by irradiating the visible light beam indicates that the section of road is passable when the controller has determined the section of road to be passable.

A tenth aspect of the invention is the device according to the eighth aspect, wherein the guidance element displayed by irradiating the visible light beam indicates that the section of road is impassable when the controller has determined the section of road to be impassable.

An eleventh aspect of the invention is the device according to the eighth aspect, wherein the road sensor acquires information regarding each of a plurality of lanes of the road, and the controller determines whether each lane is passable for the vehicle based on the information acquired by the road sensor. Also, the controller causes a guidance element to be displayed in a manner that a passable lane for the vehicle is distinguishable from an impassable lane for the vehicle based on the controller determination of whether or not each lane is passable for the vehicle.

According to a twelfth aspect of the invention, the road sensor acquires the information regarding the road from a memory provided inside or outside the vehicle, based on a current position of the vehicle.

According to a thirteenth aspect of the invention, the road sensor detects that an object is present on the section of road ahead of the vehicle, as the information regarding the section of road.

According to a fourteenth aspect of the invention, the driving operation support device comprises a speed sensor for detecting a traveling speed of the vehicle, wherein the controller stops displaying the guidance element using the visible light beam when the traveling speed detected by the speed sensor is below a predetermined speed.

A fifteenth aspect of the invention further comprises an object sensor for detecting at least one of a pedestrian and an oncoming vehicle that is present on the section of road ahead of the vehicle, wherein the controller stops displaying the guidance element using the visible light beam, when at least one of the pedestrian and the oncoming vehicle is detected by the object sensor.

Next, the effect of this invention will be described as follows.

First, according to the first, second, and third aspect enumerated above, the information regarding the section of the road ahead of the vehicle over which the vehicle is traveling is acquired by the road sensor, and it is determined by the controller whether the section of road is passable for the vehicle based on the information acquired by the road sensor. The guidance element indicating that the section of road is passable is displayed on the display at a position overlapped with the section of road as seen from the perspective of the driver, when the section of road is determined to be passable for the vehicle. Further, the guidance element is not displayed when the section of road is determined to be impassable for the vehicle. Therefore, the driver can easily recognize whether the road is passable for the vehicle, and may prevent the vehicle from traveling over the impassable section of road. Particularly, in the case that visibility ahead of the vehicle is bad due to, for example, darkness during the night and rainy weather, the driver of the vehicle can easily recognize a passable section of the road, thereby contributing to the running safety of the vehicle.

Further, according to the fourth and eleventh aspects, in the case of a road comprising multiple lanes, the road sensor acquires information regarding each of a plurality of lanes of the road, and the controller determines whether each lane is passable for the vehicle based on the information acquired by the road sensor. Thus, the controller can cause a guidance element to be displayed in a manner that a passable lane for the vehicle is distinguishable from an impassable lane for the vehicle. Therefore, if the driver has access to a passable lane for the vehicle and an impassable lane for the vehicle, the driver can easily recognize this situation, and the vehicle may be prevented from entering and traveling over the impassable lane.

Further, according to the fifth and twelfth aspects, the road sensor acquires the information regarding the section of road from a memory provided inside or outside the vehicle, based on the section of road ahead of the vehicle, and the guidance element may be displayed based on the information. Therefore, the guidance element can be displayed such that it corresponds to traffic restrictions, etc. of the road. The road sensor may be configured by using a navigation system for example, and in this case the road sensor can detect the road information, such as bus lane information and one-way traffic information for example.

Further, according to the seventh aspect, since the display is provided on a front windshield of the vehicle, the driver who is driving the vehicle while looking ahead of the vehicle can make a visual confirmation of the guidance element naturally without shifting his/her eyes much.

Further, according to the eighth, ninth, and tenth aspects, the guidance element indicating that the section of road is passable is displayed on the road by irradiating the visible light beam, when the section of road is determined to be passable for the vehicle. Further, the guidance element is not displayed when the section of road is determined to be impassable for the vehicle. In this way, the driver who is driving the vehicle while looking ahead of the vehicle can make a visual confirmation of the guidance element naturally without shifting his/her eyes so much.

Further, according to the sixth and thirteenth aspects, the road sensor can detect an object present on the section of road ahead of the vehicle as information regarding the road, and the guidance element may be displayed based on the information. Therefore, the guidance element can be displayed based on a current condition of the road. The road sensor may be configured by using a digital camera and/or radar for example, and in this case the road sensor can detect the object, such as a pedestrian and a stopping vehicle, based on the image information acquired by the digital camera for example.

Further, according to the fourteenth aspect, the controller stops displaying the guidance element using the visible light beam when the traveling speed of the vehicle detected by the speed sensor is below the predetermined speed. When the traveling speed is below the predetermined speed in this way, it is assumed that the vehicle is stopped or is about to stop, at an intersection, etc. In this case, a pedestrian may cross in front of the vehicle, or an oncoming vehicle may stop in front of the vehicle. Therefore, the guidance element using the visible light beam is not displayed, in order to prevent the pedestrian or the passenger in the oncoming vehicle from viewing a displeasurable visible light beam.

Further, according to the fifteenth aspect, the controller stops displaying the guidance element using the visible light beam when at least one of the pedestrian and the oncoming vehicle is detected by the object sensor. Therefore, this prevents the pedestrian or the passenger in the oncoming vehicle from viewing the displeasurable visible light beam.

DETAILED DESCRIPTION

Hereinafter, a driving operation support device for a vehicle according to embodiments of the invention will be described.

Embodiment 1

Figure 1:
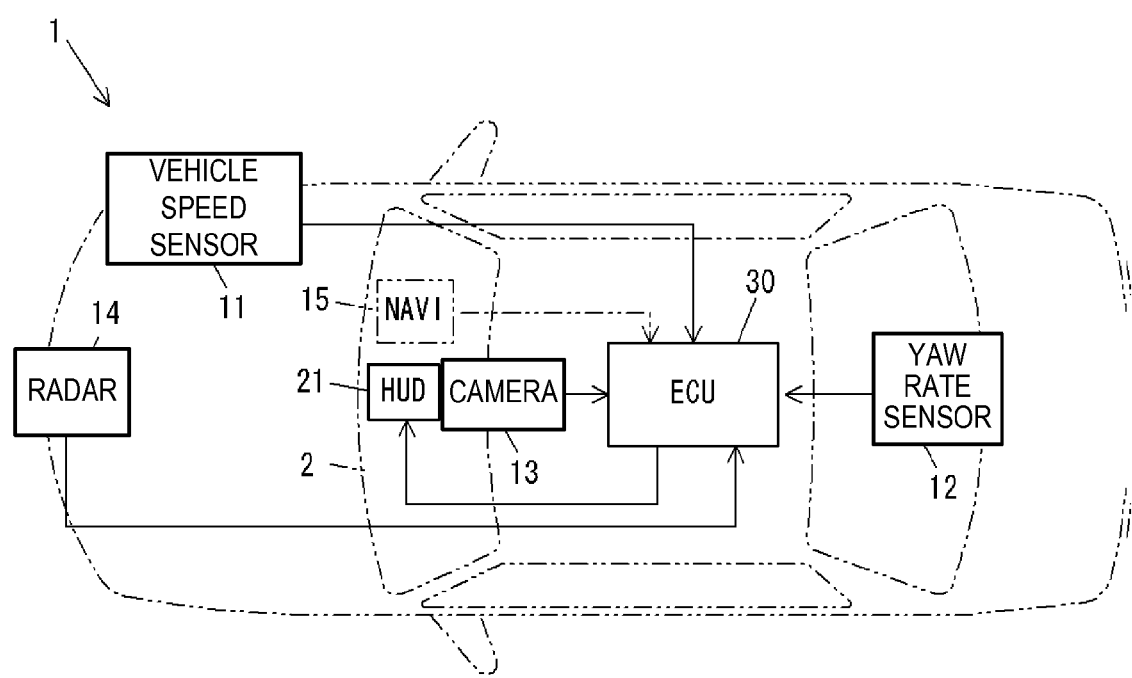
FIG. 1 is a block diagram of a driving operation support device of a vehicle according to Embodiments 1 and 2 of the present invention.

Firstly, describing Embodiment 1 as shown in FIG. 1, a vehicle 1 according to this embodiment includes a speed sensor 11, a yaw rate sensor 12, a camera 13, a radar 14, a head up display (HUD) 21, and an electronic control unit (ECU) 30.

The speed sensor 11 detects a traveling speed of the vehicle 1 and outputs a signal corresponding to the detected vehicle speed to the ECU 30.

The yaw rate sensor 12 detects a yaw rate of the vehicle 1 and outputs a signal corresponding to the detected yaw rate to the ECU 30.

The camera 13 includes, for example, a digital camera utilizing a charge coupled device (CCD) sensor or a complementary metal oxide semiconductor (CMOS) sensor attached to a front portion of a roof inside the vehicle cabin. The camera 13 captures an image of a road over which the vehicle 1 is traveling and object(s) ahead of the vehicle 1, and outputs a signal of the image to the ECU 30.

The radar 14 detects object(s) on the road ahead of the vehicle 1 and is attached to a front end portion of a front bumper of the vehicle. The radar 14 transmits a radio wave of a predetermined frequency, receives the radio wave reflected back from an object (for example, an obstacle such as another vehicle) ahead of the vehicle 1, and outputs the received signal to the ECU 30.

The head up display (HUD) 21 includes, for example, a projector arranged on an installment panel in a front portion of the vehicle cabin. The head up display 21 receives the image signal outputted from the ECU 30, and projects the image on a front windshield 2. Note that the head up display 21 includes the front windshield 2 onto which an organic electroluminescent (EL) film is pasted.

The ECU 30 includes a central processing unit (CPU), a read-only memory (ROM) for storing control programs and control data, and a random-access memory (RAM) for temporarily storing various data when the program is executed. The ECU 30 performs a predetermined calculation based on the various signals received from the speed sensor 11, the yaw rate sensor 12, the camera 13, and the radar 14, generates an image signal based on the calculation results, and outputs the image signal to the head up display 21.

Next, a specific example operation of the driving operation support device of the vehicle 1 will be described according to a flowchart of FIG. 2. Note that a control according to the flowchart is repeatedly executed for every predetermined period.

Firstly, in step S11, the ECU 30 receives various input signals from the speed sensor 11, the yaw rate sensor 12, the camera 13, and the radar 14.

Next, in step S12, the ECU 30 detects a traffic lane in which the vehicle 1 is traveling after analyzing the image signal from the camera 13. Specifically, the ECU 30 derives the number of lanes by detecting the left and right edges of the road or white lines on the road surface by analyzing the image signal from the camera 13, and detects the lane in which the vehicle 1 is traveling based on relative positions of the vehicle 1 and the white lines present on the road.

Next, in step S13, the ECU 30 detects object(s) present on the road ahead of the vehicle 1 after analyzing the image signal from the camera 13 and the signal received from the radar 14. For example, the ECU 30 detects an object such as another vehicle stopping ahead of the vehicle 1, a pedestrian crossing ahead of the vehicle 1, a fallen object on the road ahead of the vehicle 1, etc. Then, if an object is detected, the lane in which the object is present and a distance from the object are further calculated based on the image signal from the camera 13 and the signal received from the radar 14. Then, the information regarding the lane in which the object is present and the distance from the vehicle to the object is stored in the RAM.

Next, in step S14, the ECU 30 determines whether each lane is passable for the vehicle 1. Specifically, the ECU 30 determines whether each lane is passable for the vehicle 1 based on the information regarding the lane in which the object is present and the distance from the object detected in step S13, as well as the speed signal and the yaw rate signal read in step S11. For example, if an object is present in a certain lane, the ECU 30 determines that the lane is impassable for the vehicle 1 when the distance from the object is below a predetermined distance. Here, the predetermined distance is lengthened, or increased, in proportion to an increase in traveling speed of the vehicle 1. This increase in predetermined distance is attributed to the time taken into consideration for the vehicle to reach the object. Meanwhile, if there is no object present in the lane, the ECU 30 determines that the lane is passable for the vehicle 1.

Next, in step S15, the ECU 30 displays a guidance element based on the determination of passability of each lane.

Next, several example patterns regarding the guidance display will be described.

Figure 3:
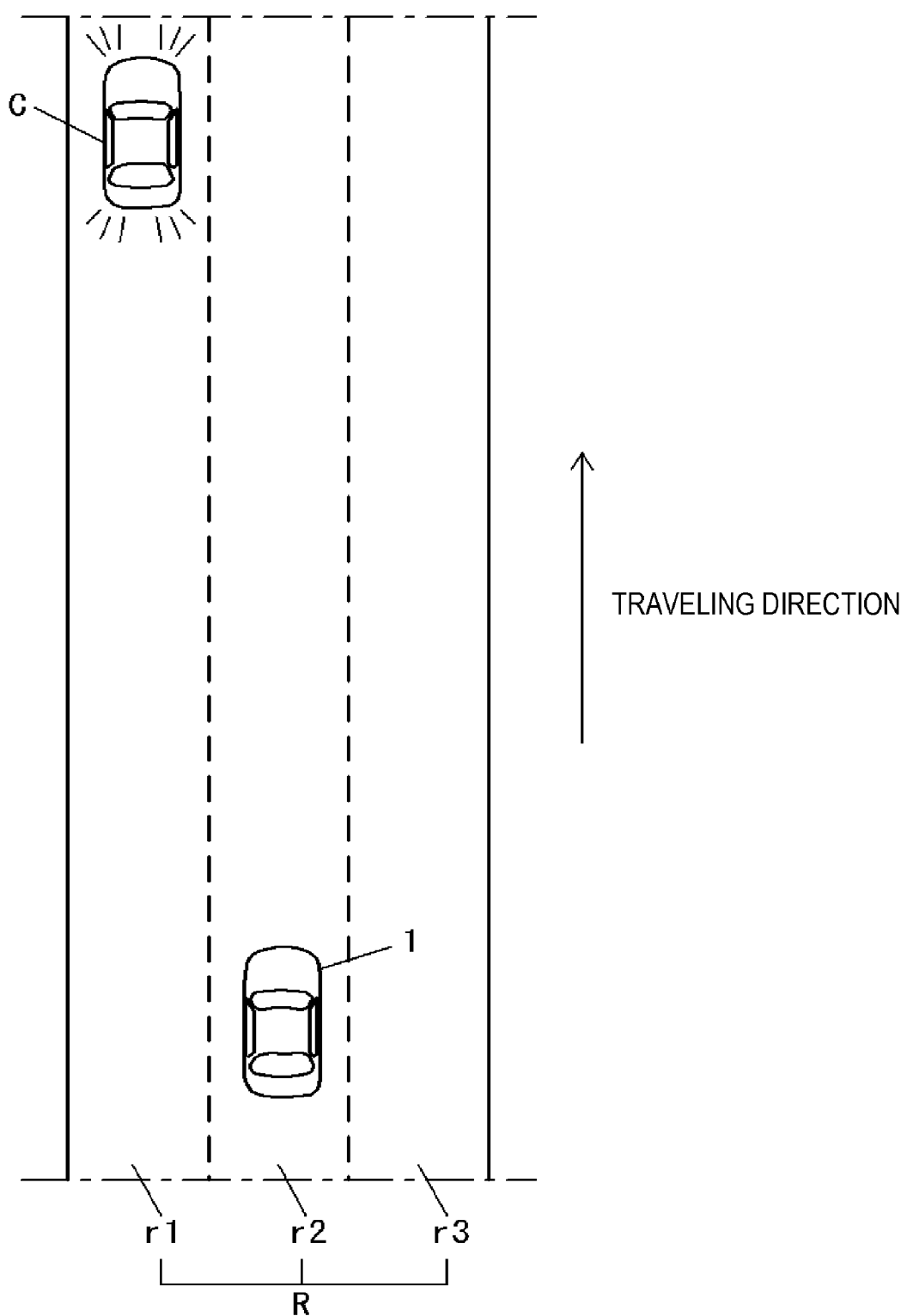
FIG. 3 is a schematic diagram illustrating a first condition in which the driving operation support device operates.
Figure 4:
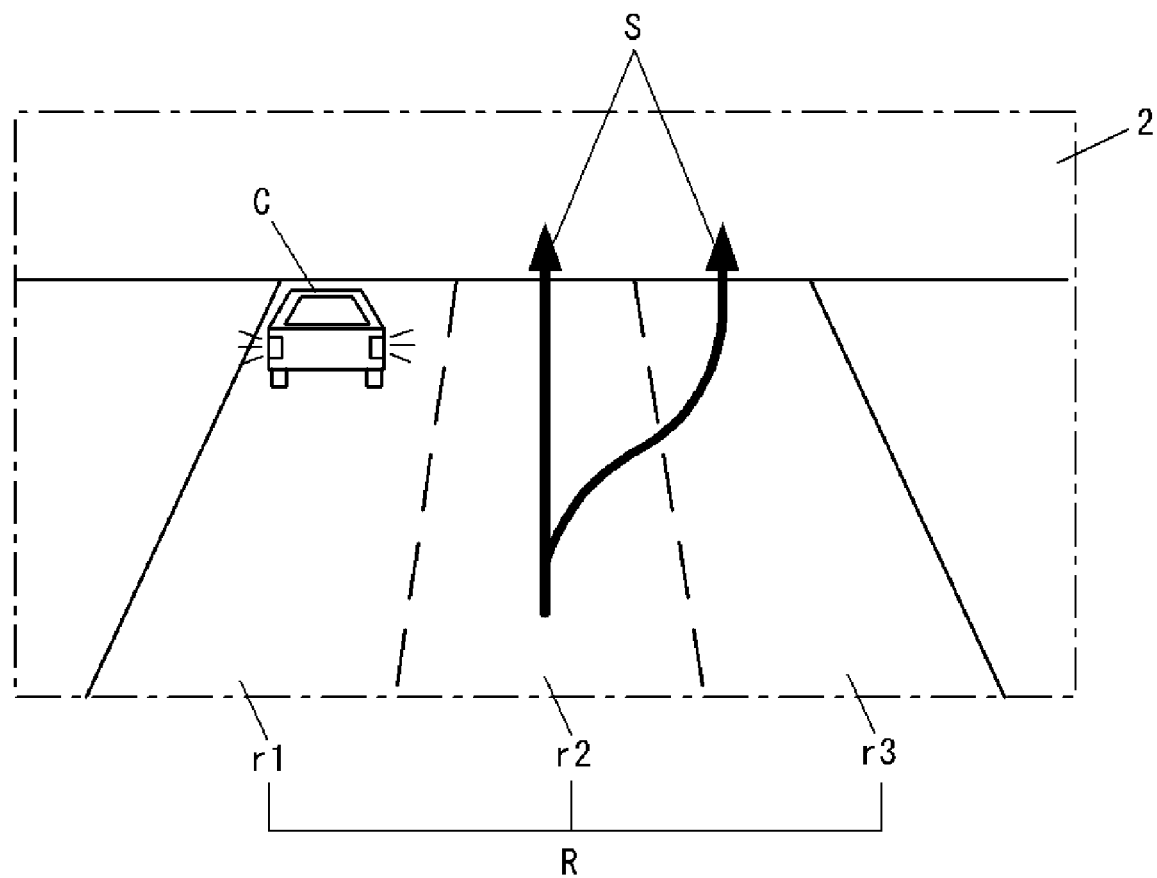
FIG. 4 is a schematic diagram illustrating a first display example of the driving operation support device.

For example, as shown in FIG. 3, when the vehicle 1 is traveling in a central lane r2 of a road R having three lanes on one side (all traveling in the same direction on that side), it is assumed that an object C (another vehicle) is detected in an immediate left lane r1 within the predetermined distance ahead of the vehicle 1, and no object is detected in the central lane r2 in which the vehicle 1 is currently traveling, nor is an object detected in an immediate right lane r3. Also, it is assumed that, as a result, the immediate left lane r1 is determined to be impassable for the vehicle 1, and the central lane r2 in which the vehicle 1 is currently traveling and the immediate right lane r3 are determined to be passable for the vehicle 1. In this case, as shown in FIG. 4, a guidance display S (a guidance element indicating that the road is passable, as described in the claims) is configured using arrows displayed on the head up display 21 on the front windshield 2 only for the central lane r2 and the immediate right lane r3. In other words, there will be no guidance display S for the left lane r1 which was determined to be impassable for the vehicle 1. Consequently, since there is no guidance display S for the immediate left lane r1, a driver of the vehicle 1 will be able to understand that the left lane r1 is impassable, and thereby the vehicle 1 may be prevented from traveling in the impassable left lane r1. Note that FIG. 4 represents a view seen from the driver's point of view, or perspective. As understood from the drawing, the guidance display S is displayed so as to be overlapped on the central lane r2 and the right lane r3 as seen from the driver's perspective, visible through the front windshield 2. Note that, for example, accuracy of the overlapping can be improved by detecting the driver's point of view.

Here, when the same determination has been made as described above, it may also be displayed as shown in FIG. 5.

Figure 6:
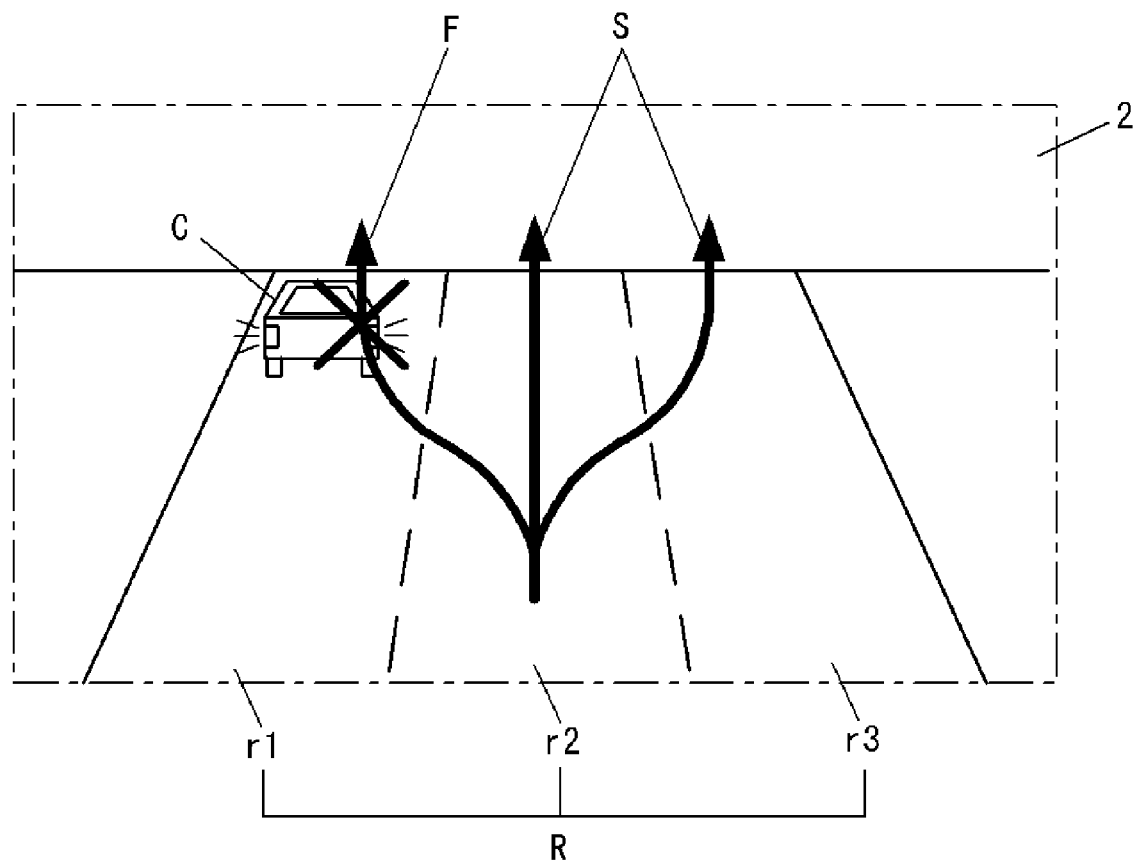
FIG. 6 is a schematic diagram illustrating a third display example of the driving operation support device.

That is, while a guidance display S (a guidance element indicating that the road is passable, as described in the claims) may be configured using arrows displayed similarly to the case of FIG. 4 where the central lane r2 and the right lane r3 have been determined to be passable for the vehicle 1 and the left lane r1 has been determined to be impassable for the vehicle 1, another guidance display F (a guidance element indicating that the road is impassable, as described in the claims) is configured using an arrow and an X symbol provided at the tip of the arrow for display. Consequently, the driver can make a visual confirmation that the left lane r1 is impassable for the vehicle 1 and the vehicle may be prevented from traveling in the impassable left lane r1. Note that the guidance display F that indicates that the lane is impassable may be displayed as an overlapped guidance display of an arrow and an X symbol as shown in FIG. 6, and the same overlapping effect described above with respect to FIG. 4 can be achieved.

Embodiment 2

Next, Embodiment 2 will be described as follows. Note that explanations of components of Embodiments 2 through 4 that are the same or similar to components of Embodiment 1 will be omitted from hereon, and the same reference numerals are used when referring to same or similar components.

A vehicle 1 according to Embodiment 2 includes a navigation system (NAVI) 15 (refer to FIG. 1) in addition to the system of Embodiment 1. Accordingly, the ECU 30 performs a partially different control than that of Embodiment 1.

The navigation system 15 includes a GPS module attached to a roof portion of the vehicle 1 for detecting information on the current position (latitude and longitude), a storage module (road information storage medium) for storing road information, and an information read-out module for reading out the road information of a predetermined range, taking the current location as the center based on the positional information detected from the GPS module, and outputting the road information read by the information read-out module to the ECU 30. Here, this road information includes information including the number of lanes, bus lane information, and traffic restriction information, such as one-way traffic information.

Then, the ECU 30 performs a predetermined calculation based on the road information received from the navigation system 15 in addition to the various signals described above which are inputted from a speed sensor 11, a yaw rate sensor 12, a camera 13, and a radar 14. The ECU 30 then generates an image signal according to the results of the calculation, and outputs the image signal to the head up display 21.

Figure 7:
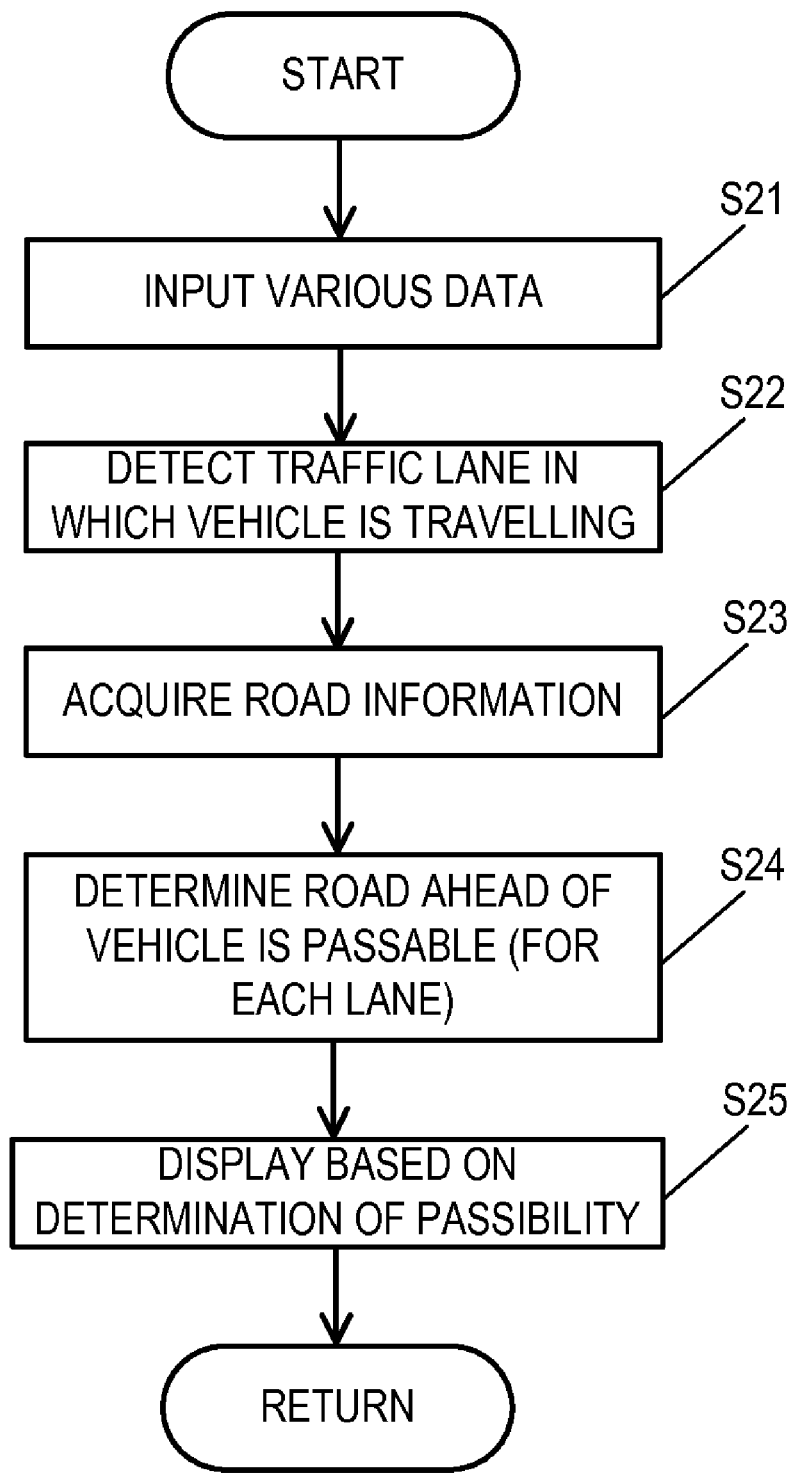
FIG. 7 is a flowchart showing an example control by the driving operation support device according to Embodiment 2 of the invention.

Next, a specific example operation of a driving operation support device of the vehicle 1 according to this embodiment will be described according to a flowchart of FIG. 7. Note that a control according to the flowchart is repeatedly executed for every predetermined period.

Firstly, in step S21, the ECU 30 receives the various input signals from the speed sensor 11, the yaw rate sensor 12, the camera 13, and the radar 14.

Figure 2:
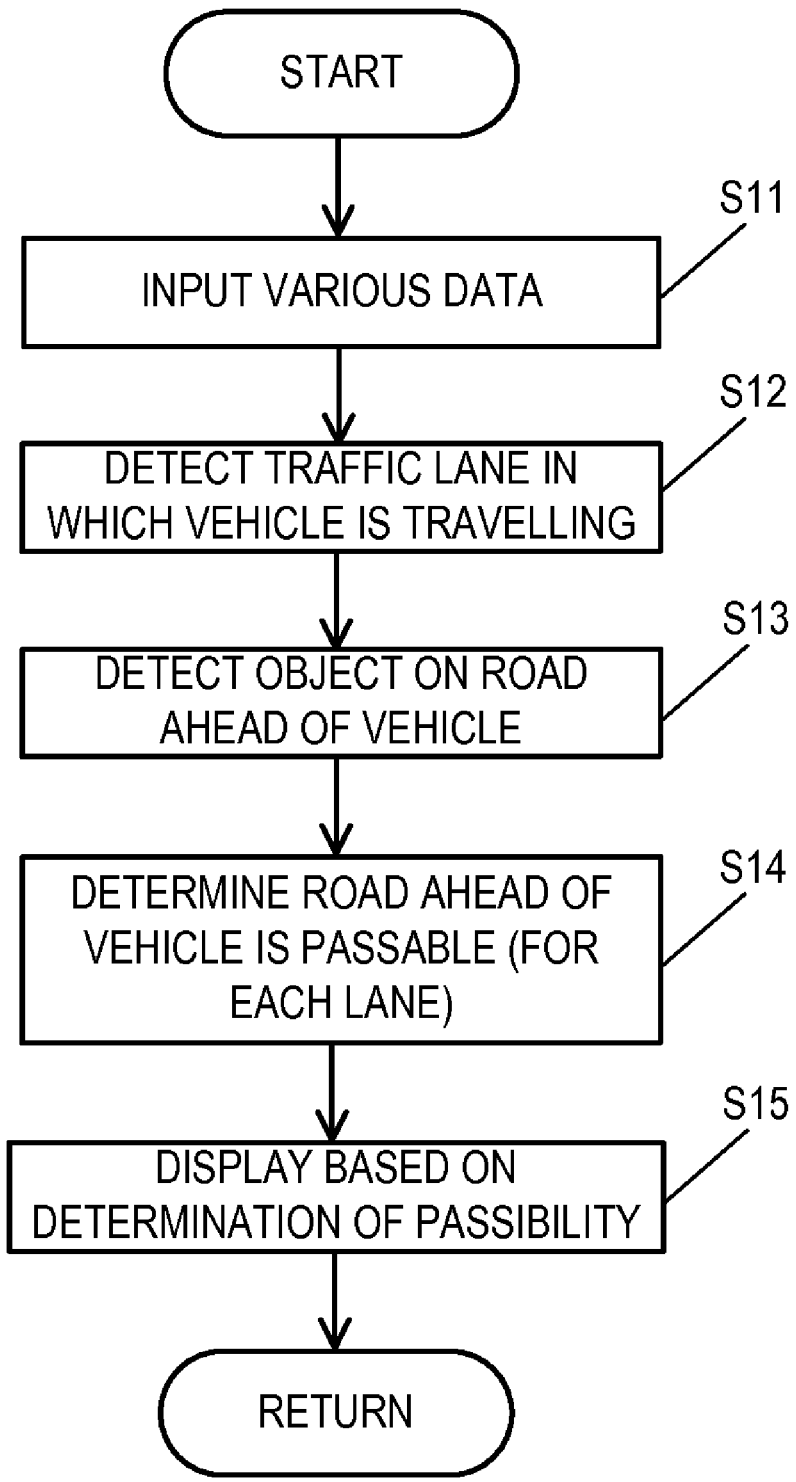
FIG. 2 is a flowchart showing an example control by the driving operation support device according to Embodiment 1 of the invention.

Next, in step S22, the ECU 30 detects a lane in which the vehicle is traveling after analyzing the image signal from the camera 13, similar to step S12 of FIG. 2, with respect to Embodiment 1.

Next, in step S23, the ECU 30 acquires road information from the navigation system 15. In a case where time information is accompanied with the road information (for example, road information may be accompanied with information including a time period during which a characteristic of traffic, such as use of a bus lane, is regulated), the ECU 30 acquires both time information and road information together.

Next, in step S24, the ECU 30 determines whether each lane is passable for the vehicle 1. Specifically, the ECU 30 determines whether each lane is passable for the vehicle 1 based on the road information acquired from the navigation system 15, the speed detected from the speed sensor 11, and the yaw rate detected from the yaw rate sensor 12. For example, in a case where the road is constituted of a plurality of lanes, if one of the lanes is a bus lane (and assuming that the vehicle 1 is not a bus), the ECU 30 determines that the lane is impassable for the vehicle 1. Further, in the case of a one-way road (where only travel on the road opposite to the traveling direction of the vehicle 1 is permitted), the ECU 30 determines that the lane, or one-way road is impassable for the vehicle 1. In cases other than these, the ECU 30 determines that the lane/road is passable for the vehicle 1. However, in cases where the vehicle speed and the yaw rate have been considered unsuitable for traveling in the lane or on the road, the lane/road is determined to be impassable for the vehicle 1.

Next, in step S25, the ECU 30 displays a guidance element based on the determination of the passability for each lane.

Next, several patterns will be described regarding the configuration of the guidance display of Embodiment 2.

Figure 8:
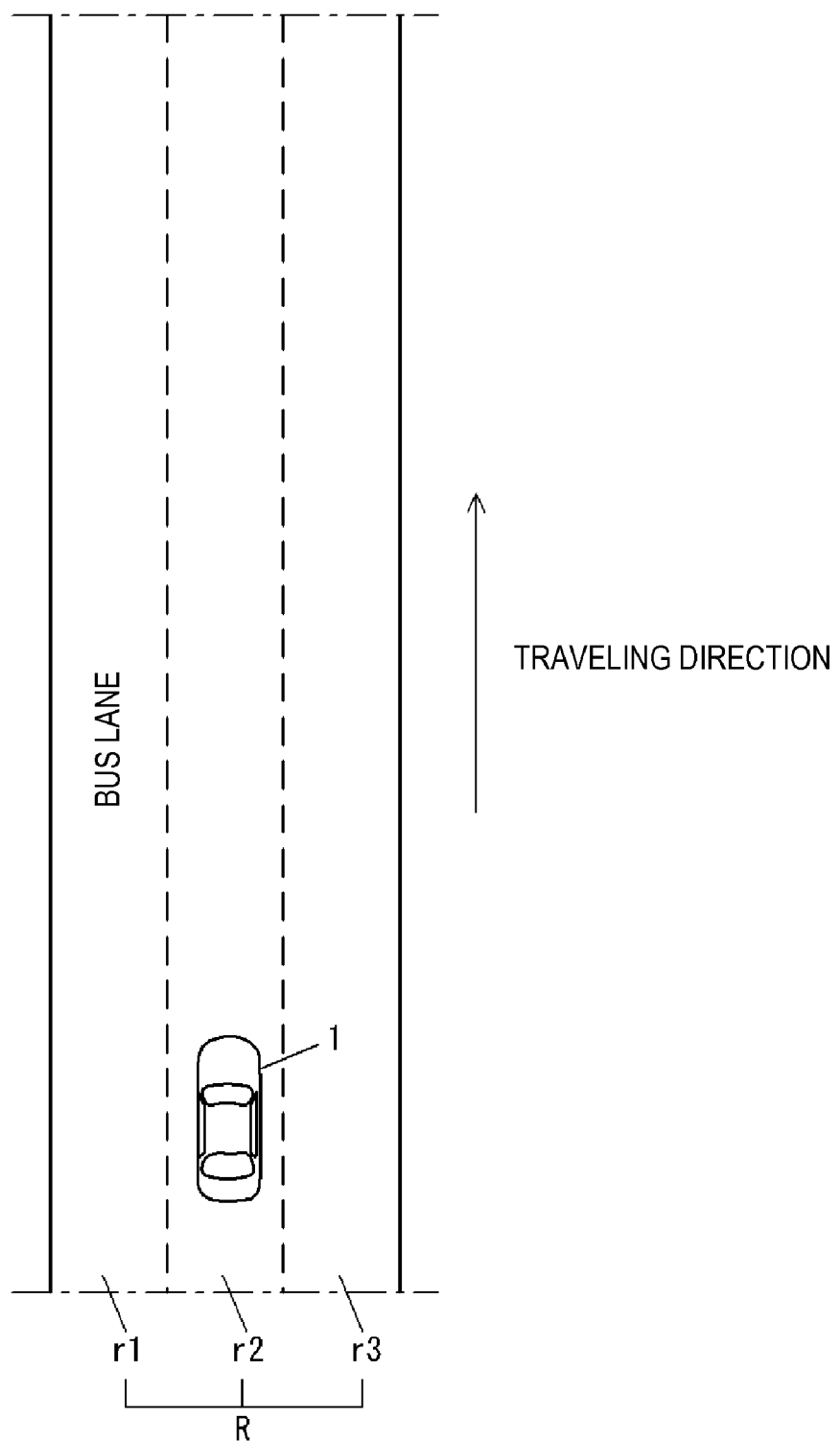
FIG. 8 is a schematic diagram illustrating a second condition in which the driving operation support device operates.

For example, as shown in FIG. 8, it is assumed that when the vehicle 1 is traveling in a central lane r2 on one side of a three-lane road R, it is determined that an immediate left lane r1 is impassable from the fact that the lane r1 is a bus lane and the current time comes under the time period of traffic regulation (e.g., a time period where only buses are allowed to travel in the bus lane). Also, it is assumed that the traffic regulations allow travel of the vehicle 1 in the central lane r2 in which the vehicle 1 is currently traveling and an immediate right lane r3, and it is determined that the lanes are passable for the vehicle 1. In this case, similar to FIG. 4 described above, a guidance display S configured using arrows is displayed by the head up display 21 on the front windshield 2 only for the central lane r2 and the immediate right lane r3 (corresponding to a guidance element indicating that the road is passable, as described in the claims). In other words, there will be no guidance display S for the lane r1 that was determined to be impassable for the vehicle 1. Consequently, since there is no guidance display S for the immediate left lane r1, a driver will be able to understand that the relevant left lane r1 is impassable for the vehicle 1 and the vehicle 1 may be prevented from traveling in the impassable left lane r1.

Figure 5:
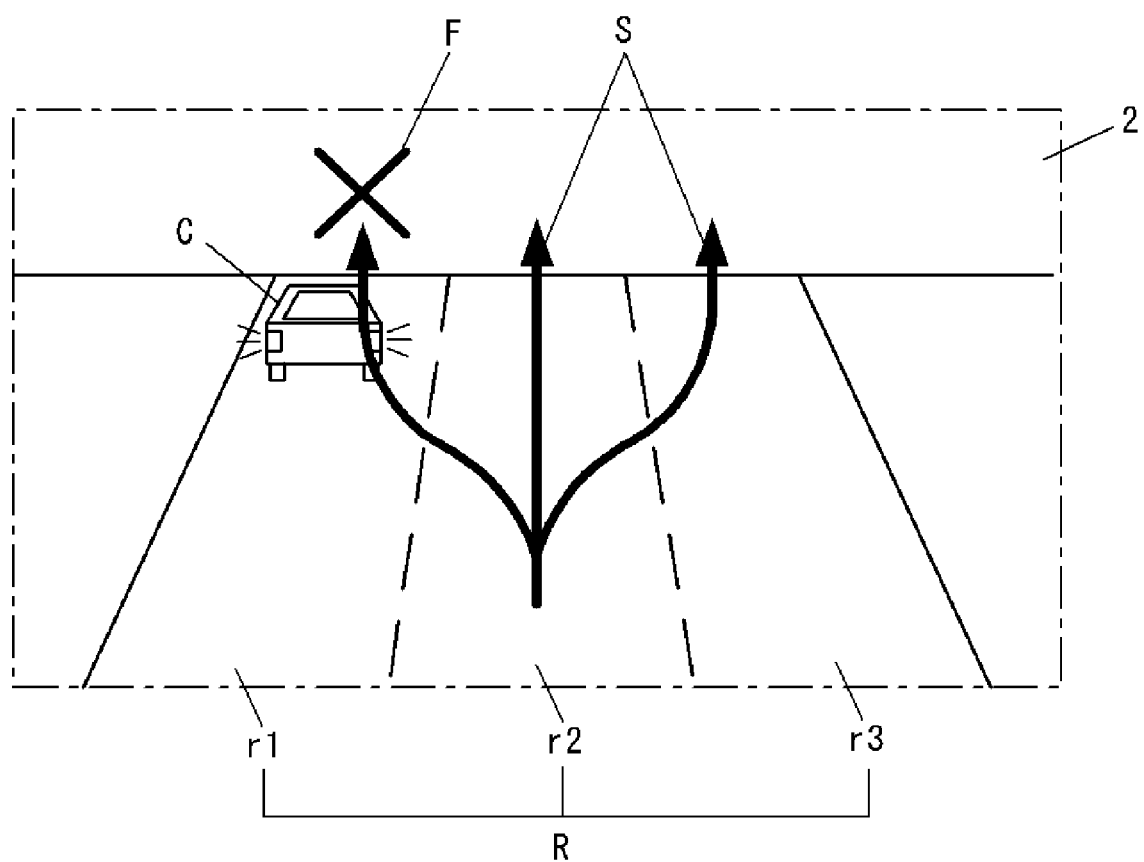
FIG. 5 is a schematic diagram illustrating a second display example of the driving operation support device.

Note that the guidance display S may be displayed similar to that of FIG. 5 and FIG. 6 of Embodiment 1 in this Embodiment 2 and the same effect can be achieved also in this case.

Figure 9:
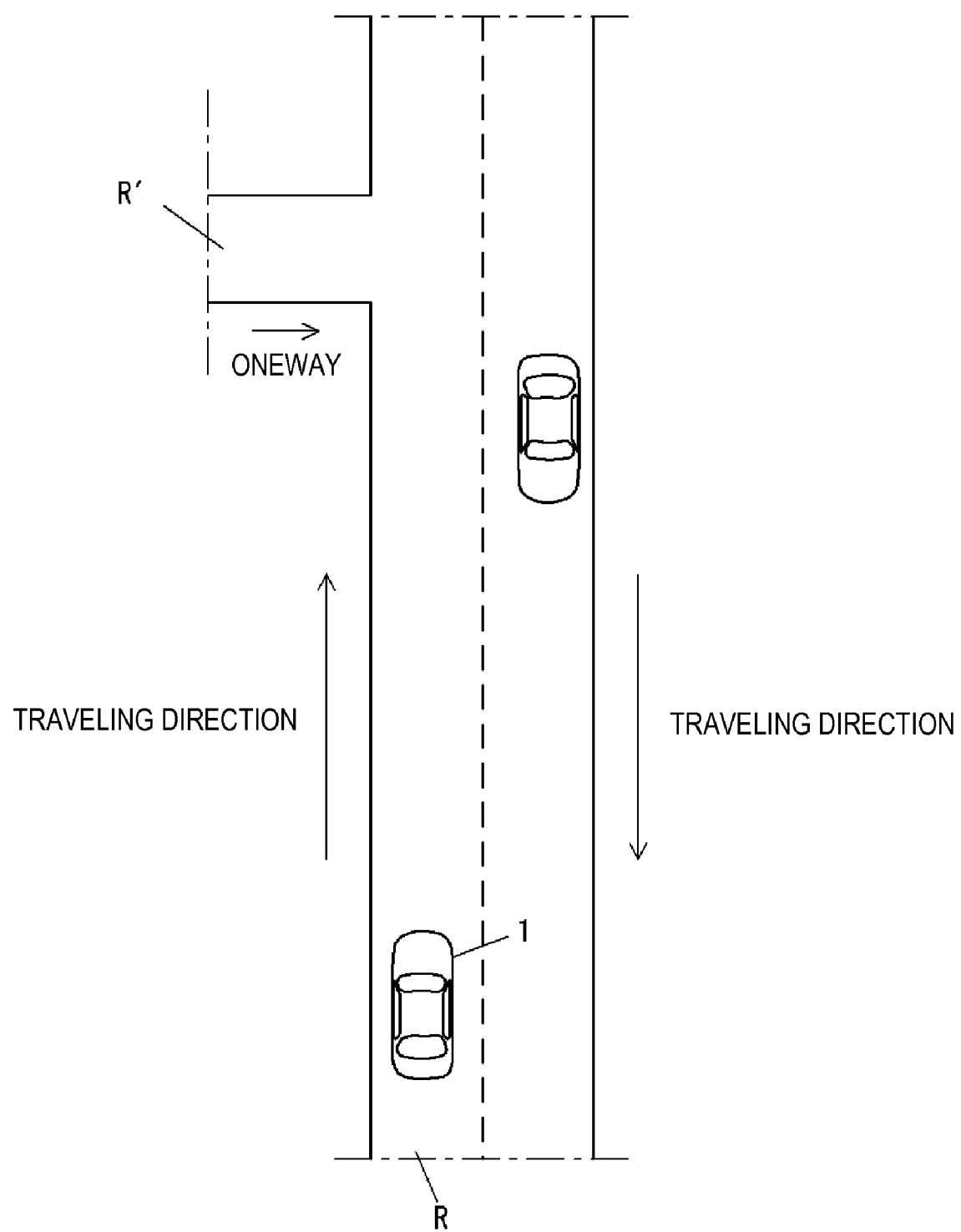
FIG. 9 is a schematic diagram illustrating a third condition in which the driving operation support device operates.
Figure 10:
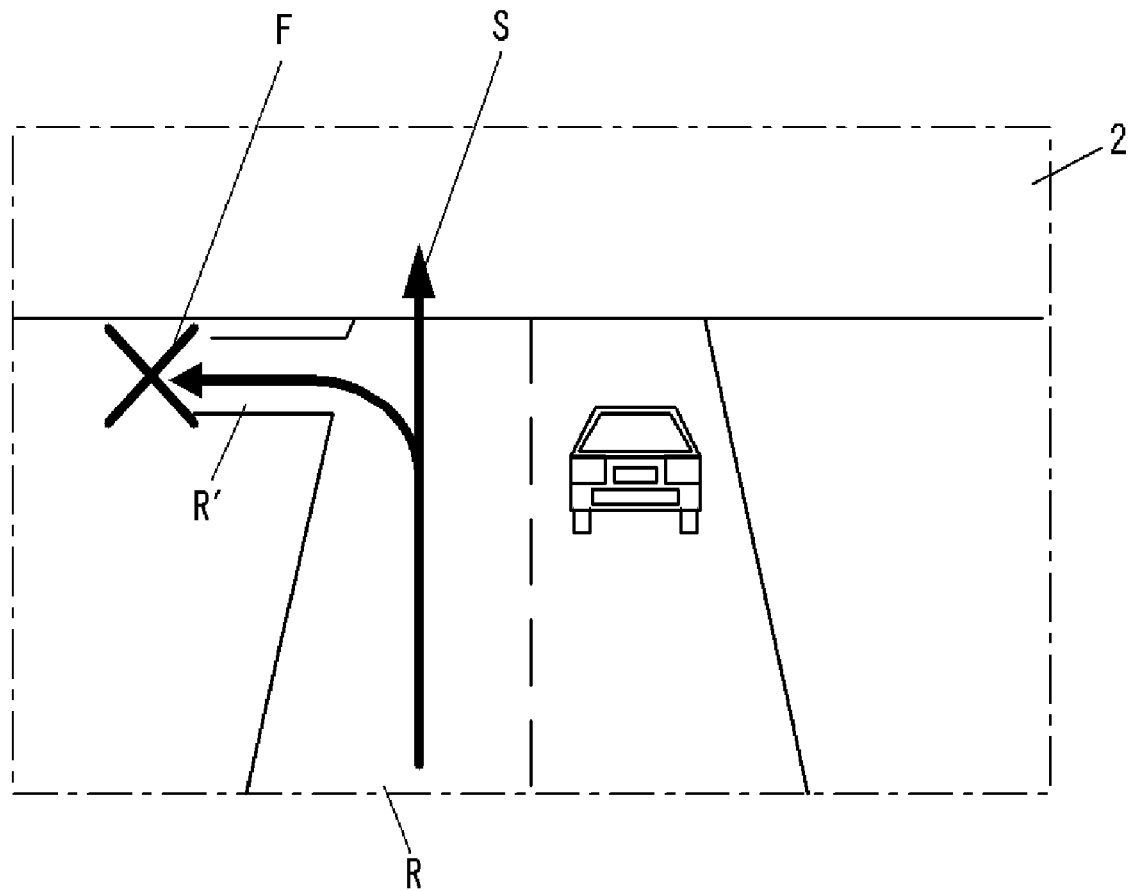
FIG. 10 is a schematic diagram illustrating a fourth display example of the driving operation support device.

Further, for example, as shown in FIG. 9, it is assumed that the vehicle 1 is traveling in a lane of the road R having one lane on one side, and a one-way road R' (that is, a road that permits travel only in a direction opposite to the traveling direction of the vehicle 1) intersecting with road R ahead of the vehicle 1 is detected within a predetermined distance from the vehicle 1, and it is determined that the one-way road R' is impassable for the vehicle 1. Also, it is assumed that the road R over which the vehicle 1 is currently traveling is determined to be passable for the vehicle 1 (e.g., it is not a road that permits travel only in a direction opposite to the traveling direction of the vehicle 1, i.e., it is not a one-way road that only permits travel opposite to the traveling direction of the vehicle). In this case, as shown in FIG. 10, a guidance display S is configured using an arrow displayed by the head up display 21 on the front windshield 2 regarding the road R that has been determined to be passable for the vehicle 1 (corresponding to a guidance element indicating that the road is passable, as described in the claims). Meanwhile, another guidance display F configured using an arrow and an X symbol provided at the tip of the arrow is displayed for the one-way road R' that has been determined to be impassable for the vehicle 1 (corresponding to a guidance element indicating that the road is impassable, as described in the claims). Consequently, since the guidance display F indicates that the vehicle 1 is not allowed to travel on the road R' that has branched from the road R on which the vehicle 1 is currently traveling, a driver will be able to understand that the road R' is a 'no entry' road and is impassable; hence, it may be possible to prevent the vehicle 1 from accidentally entering the one-way road R'.

Note that the X symbol alone may be displayed instead of displaying the X symbol together with an arrow as the guidance display F which indicates that the road is impassable. Further, the X symbol and the arrow may be displayed as overlapping each other.

Embodiment 3

Next, Embodiment 3 will be described.

Figure 11:
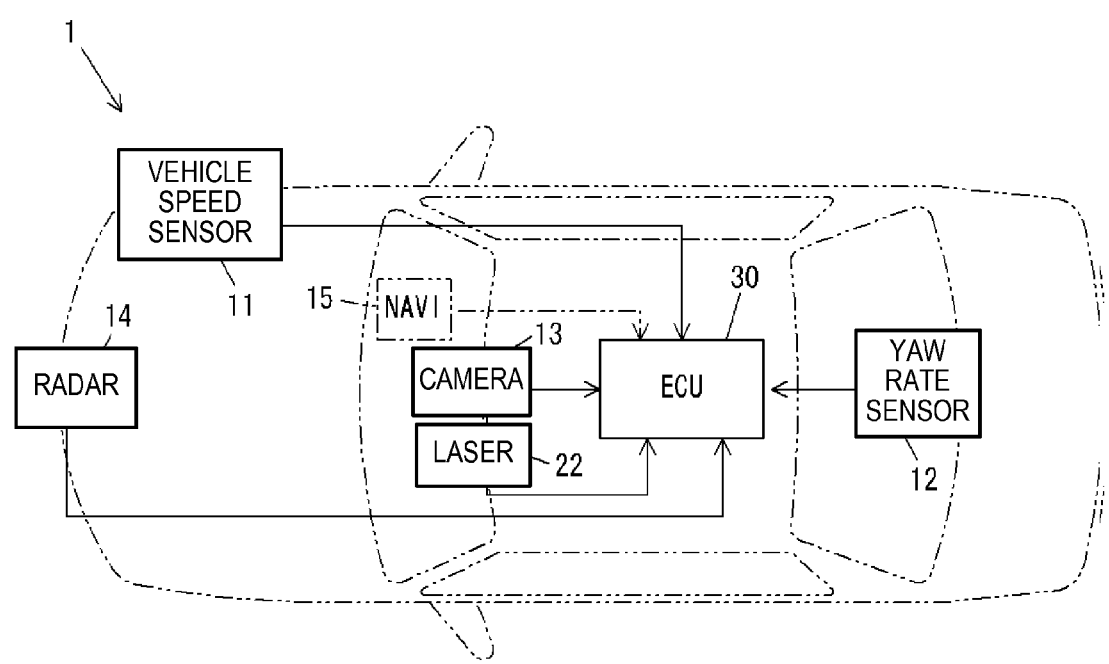
FIG. 11 is a block diagram of a driving operation support device of a vehicle according to Embodiments 3 and 4 of the present invention.

A vehicle 1 according to Embodiment 3 includes a laser 22 as shown in FIG. 11 instead of the head up display 21 of Embodiment 1. Accordingly, an ECU 30 of this embodiment performs a partially different control than that of Embodiment 1.

The laser 22 is attached to a front end portion of a roof inside the vehicle cabin, and the irradiation direction of the visible light beam is made variable. The laser 22 renders a guidance display, or guidance element, of a predetermined shape on a road surface over which the vehicle 1 is traveling by controlling the irradiation direction and an ON/OFF of the irradiation of the visible light beam in accordance with a control signal outputted from the ECU 30. Note that the intensity of the visible light is set to an intensity that has no harmful effect on human beings.

Then, ECU 30 performs a predetermined calculation based on various signals inputted from a speed sensor 11, a yaw rate sensor 12, a camera 13, and a radar 14. The ECU 30 generates a laser control signal according to the results of the calculation, and outputs this laser control signal to the laser 22.

Figure 12:
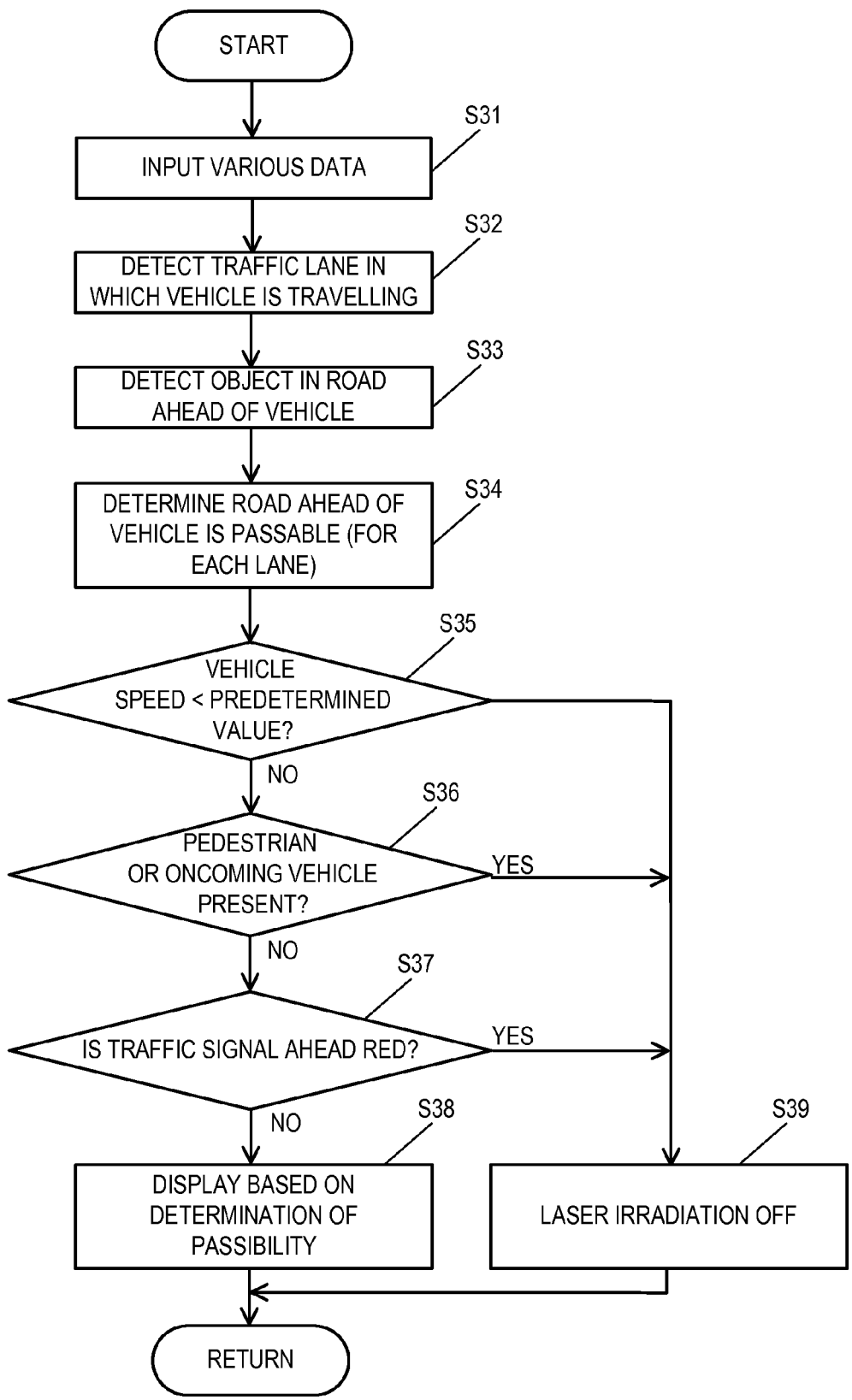
FIG. 12 is a flowchart showing an example control by the driving operation support device according to Embodiment 3 of the invention.

Next, a specific operation example of a driving operation support device of the vehicle 1 of this embodiment will be described according to a flowchart illustrated in FIG. 12. Note that a control according to the flowchart is repeatedly executed for every predetermined period.

Note that, in step S31 to step S34, a control similar to the control described by step S11 to step S14 of Embodiment 1 (FIG. 2) is performed.

In step S35 to step S37, the ECU 30 carries out various determinations; then according to the results of the determinations, it displays a guidance display based on whether a road is passable or not in step S38, and switches the laser irradiation OFF in step S39. That is, the guidance display using the visible light beam stops being displayed.

Now, describing step S35 in detail, the ECU 30 determines whether a speed detected by the speed sensor 11 is below a predetermined speed (for example, 5 km/hr). Then, if it is below the predetermined speed (YES) in step S35, the ECU 30 switches the laser irradiation OFF and stops displaying the guidance display using the visible light beam in step S39. This situation may occur when the traveling speed of the vehicle is below the predetermined speed (for example, 5 km/hr), that is, when the vehicle 1 stops or is about to stop at an intersection, etc. In this case, a pedestrian may possibly cross in front of the vehicle 1, or an oncoming vehicle may possibly stop ahead of the vehicle 1. Therefore, the guidance using the visible light beam stops being displayed in order for the pedestrian or a driver in an oncoming vehicle not to feel the displeasure of being irradiated by the visible light beam. Meanwhile, in the case that the speed is not below the predetermined speed (NO) in step S35, the ECU 30 will execute the determinations of step S36.

In step S36, the ECU 30 determines whether there is a pedestrian or an oncoming vehicle present within a predetermined distance (e.g. 50 m) ahead of the vehicle 1. Here, the ECU 30 is configured to recognize a pedestrian or an oncoming vehicle by analyzing an image signal captured by the camera 13 or by analyzing a signal received from the radar 14. When a pedestrian or an oncoming vehicle is present (YES) in step S36, the ECU 30 switches the laser irradiation OFF and stops displaying the guidance using the visible light beam in step 39. This is performed in order to prevent the laser 22 from irradiating the pedestrian or the oncoming vehicle. Meanwhile, if there are no pedestrians or oncoming vehicles present (NO), the ECU 30 executes the determination of step S37.

In step S37, the ECU 30 determines whether the traffic signal, within a predetermined distance ahead of the vehicle 1, is red. Here, the ECU 30 is configured to detect a color of the illuminating traffic signal by extracting image data of the traffic signal after analyzing image data acquired by the camera 13. When the traffic signal is red (YES), the ECU 30 switches the laser irradiation OFF and stops displaying the guidance display using the visible light beam in step S39. This is because, when the traffic light is red, it is a similar case to the case of the vehicle speed being below the predetermined speed (for example, 5 km/hr). Note that the detection of a red signal in step S37 is also possible by installing a communicable system in the vehicle 1, using a DSRC (Dedicated Short Range Communication) signaling method between this system and traffic signals, for example. Further, a red traffic signal may be detected by using both of the methods described above, and in this way, the guidance display using the visible light beam can be more reliably operated.

Meanwhile, in step S37, when the traffic signal is not red (NO), the ECU 30 displays a guidance display based on whether each lane is passable in step S38.

Next, several example patterns will be described regarding the guidance display.

Figure 13:
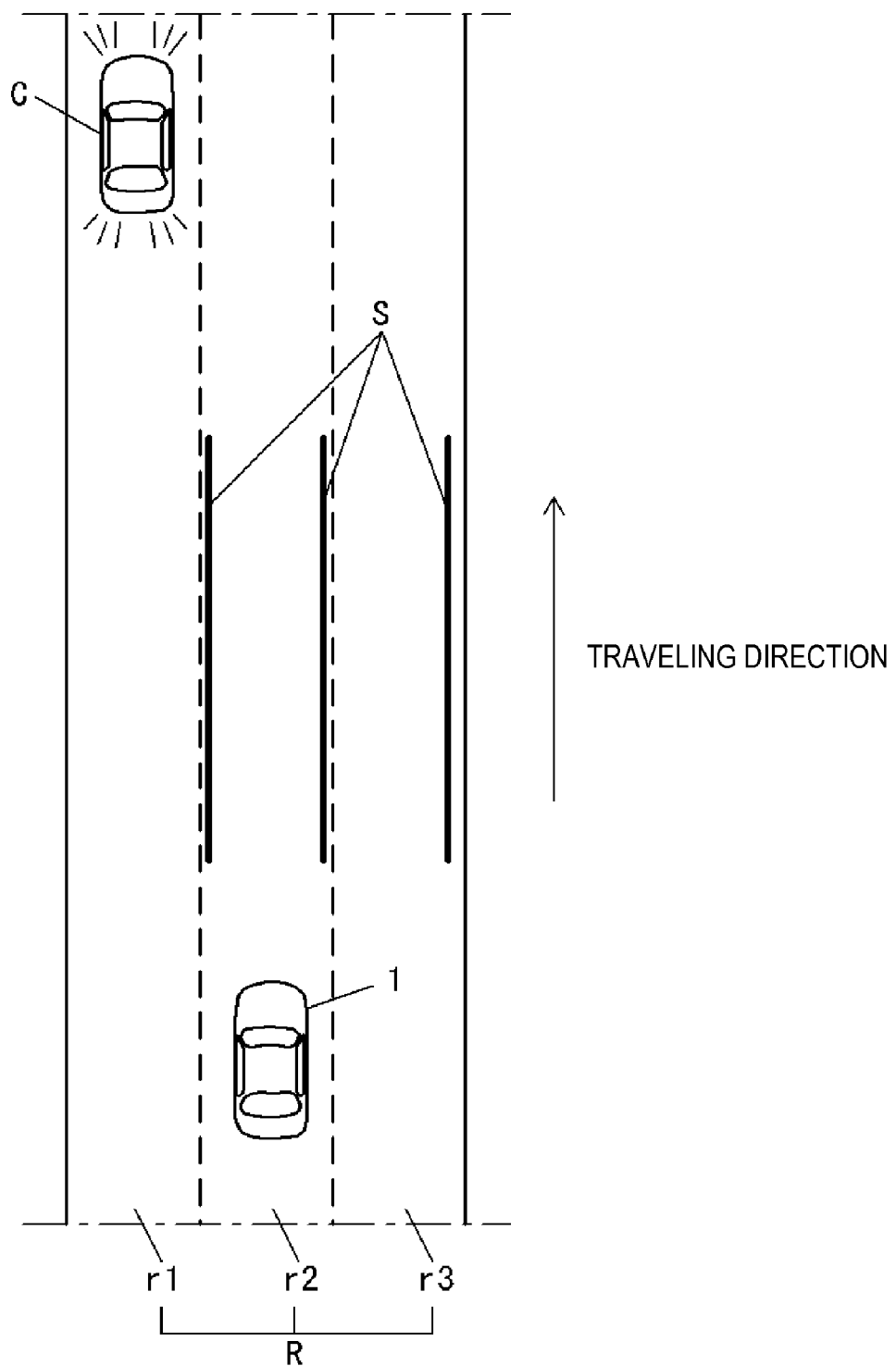
FIG. 13 is a schematic diagram illustrating a fifth display example of the driving operation support device.

For example, as shown in FIG. 13 (the same conditions as in FIG. 3 described above), when the vehicle 1 is traveling in a central lane r2 of a road R having three lanes on one side, an object C (another stopping vehicle) is detected in an immediate left lane r1 within a predetermined distance from the vehicle 1, and no object is detected ahead of the vehicle 1 in the central lane r2 in which the vehicle is currently traveling nor in an immediate right lane r3. As a result, the immediate left lane r1 is determined to be impassable for the vehicle 1 and the central lane r2, in which the vehicle 1 is currently traveling, and the immediate right lane r3 are determined to be passable for the vehicle 1. In this case, as shown in FIG. 13, by irradiating the road surface of the road R with the visible light beam using the laser 22, a guidance display S configured by lines (hereinafter, arbitrarily called "lane identification lines") extending in the traveling direction of the vehicle 1 at an edge, or end, of the lane (in the width direction) is displayed only for the central lane r2 and the immediate right lane r3 (corresponding to a guidance element indicating that the road is passable, as described in the claims). Consequently, since there is no guidance display S for the immediate left lane r1, a driver will be able to understand that the left lane r1 is impassable for the vehicle 1, and thereby the vehicle 1 can be prevented from traveling in the impassable left lane r1.

Figure 14:
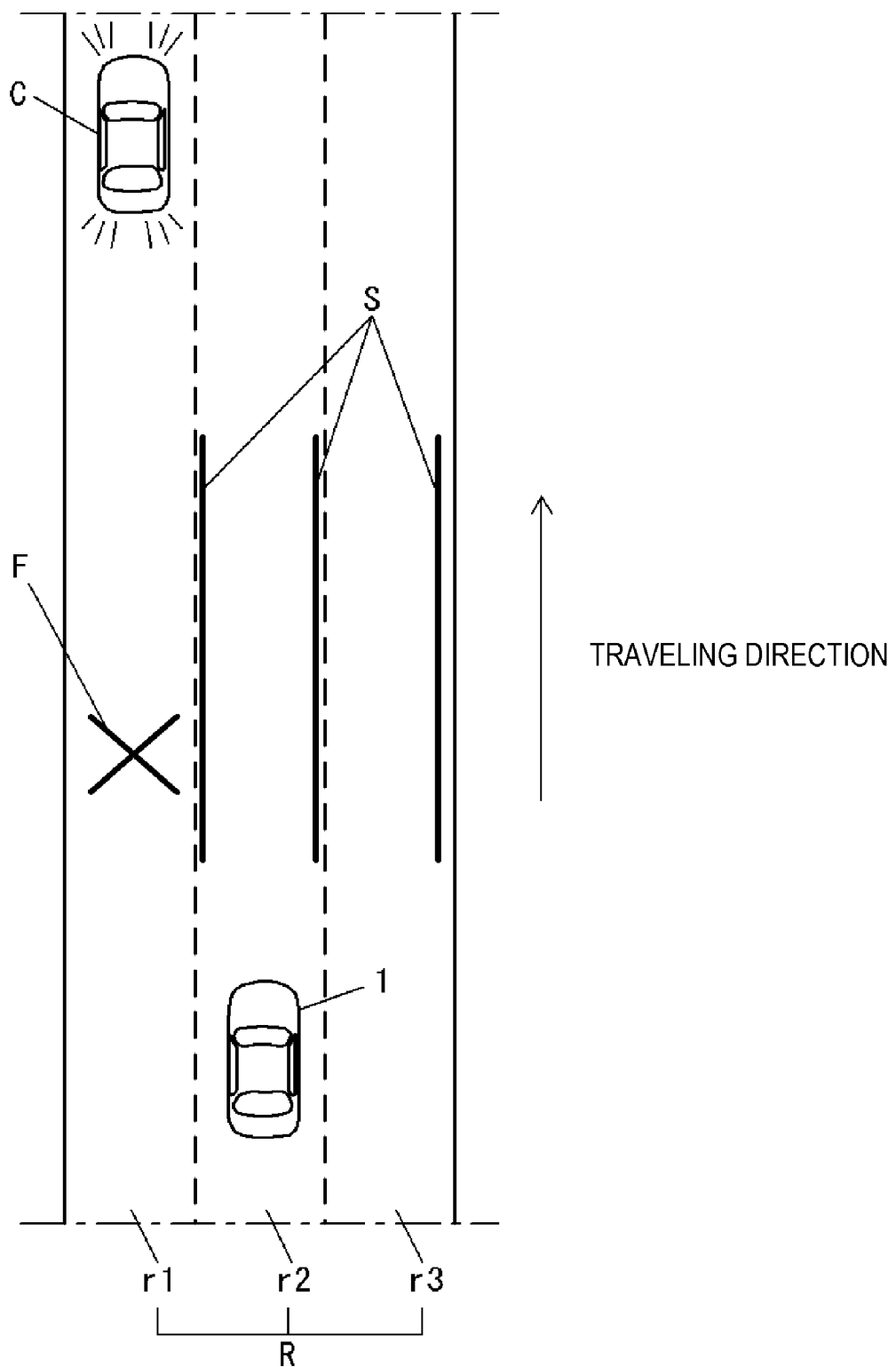
FIG. 14 is a schematic diagram illustrating a sixth display example of the driving operation support device.

Further, when the determination has been made as described above, it may also be displayed as shown in FIG. 14. That is, a guidance display S configured using the lane identification lines is displayed for the central lane r2 and the right lane r3 which have been determined to be passable for the vehicle 1 (corresponding to a guidance element indicating that the road is passable, as described in the claims), and in addition, another guidance display F configured using an X symbol is displayed for the left lane r1 that has been determined to be impassable for the vehicle 1 (corresponding to a guidance element indicating that the road is impassable, as described in the claims). Consequently, the driver can make a visual confirmation that the left lane r1 is impassable for the vehicle 1 and the vehicle 1 can be prevented from traveling in the impassable left lane r1.

Figure 15:
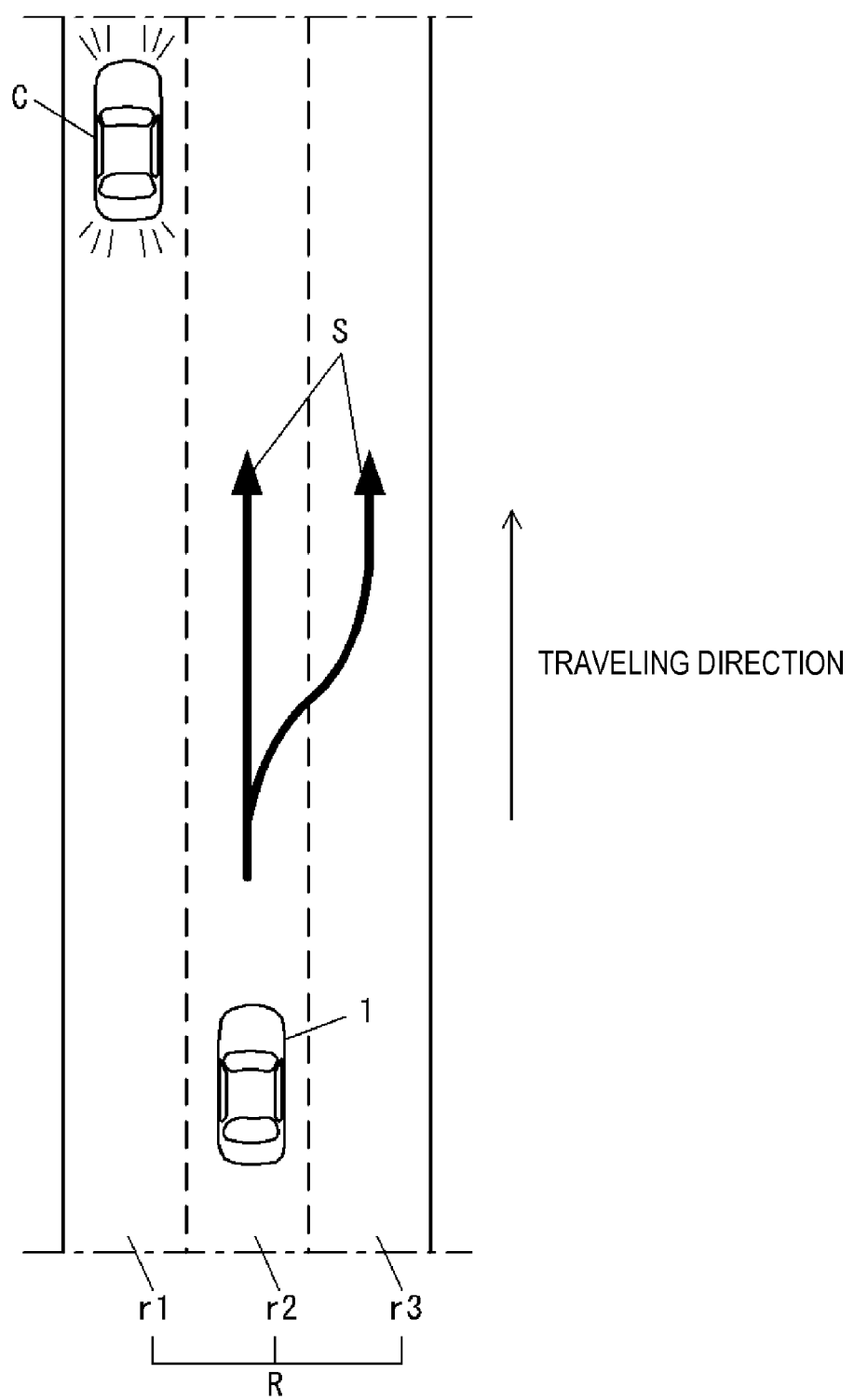
FIG. 15 is a schematic diagram illustrating a seventh display example of the driving operation support device.

Further, the guidance display may also be displayed as shown in FIG. 15. That is, by irradiating the road surface of the road R with a visible light beam using the laser 22, a guidance display S configured by arrows will be displayed only for the central lane r2 and immediate right lane r3 (corresponding to a guidance element indicating that the road is passable, as described in the claims). Consequently, since there is no guidance display S for the immediate left lane r1, the driver will be able to understand that the left lane r1 is impassable for the vehicle 1 and the vehicle 1 can be prevented from traveling on the impassable left lane r1.

Figure 16:
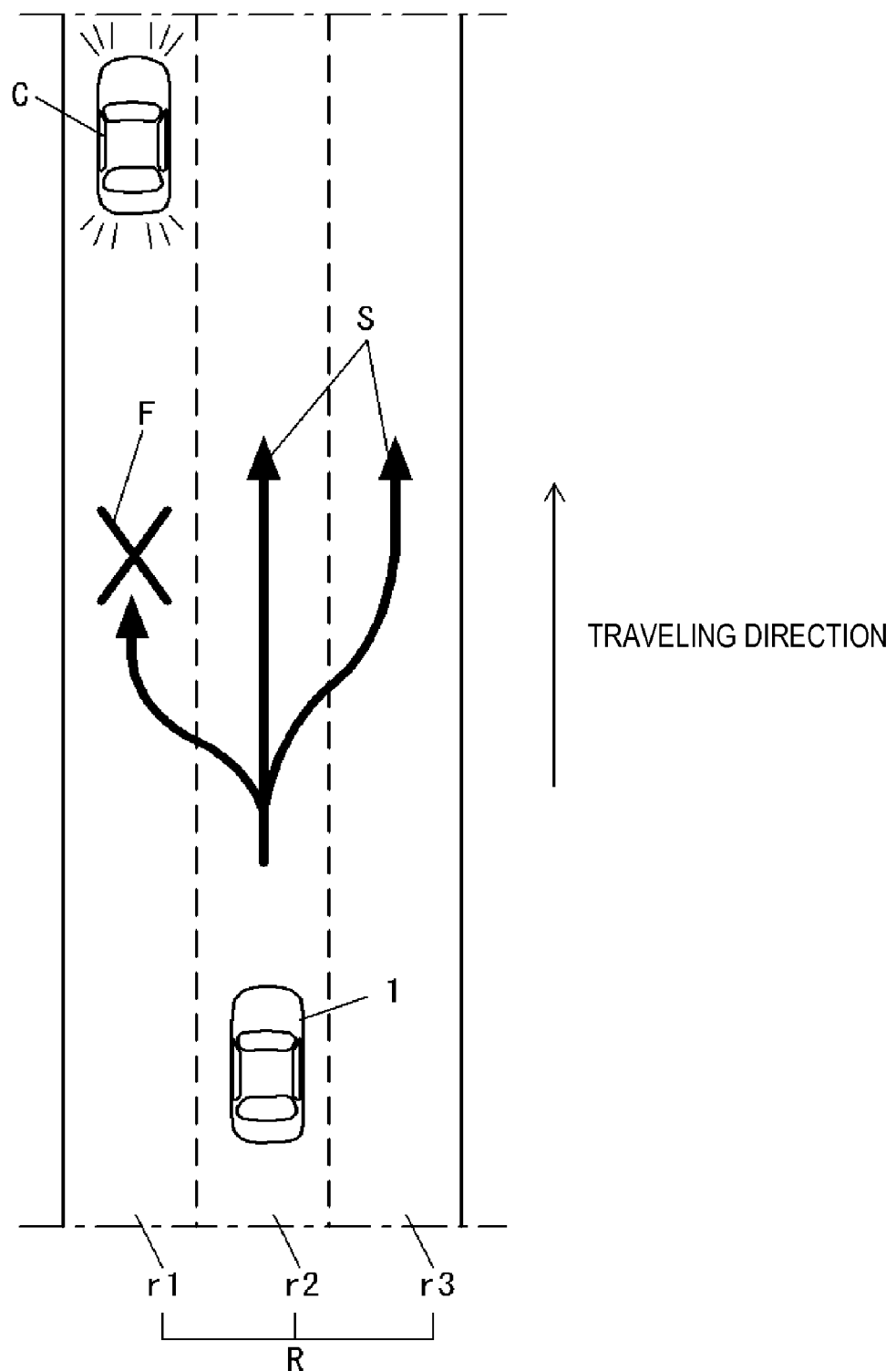
FIG. 16 is a schematic diagram illustrating an eighth display example of the driving operation support device.

Note that, when the guidance display S is configured using arrows in this way, it may also be displayed as shown in FIG. 16. That is, the guidance display S configured using arrows will be displayed only for the central lane r2 and the immediate right lane r3 (corresponding to a guidance element indicating that the road is passable, as described in the claims) similar to the case shown in FIG. 15, and another guidance display F configured using an arrow and an X symbol provided at the tip of the arrow is displayed for the left lane r1 that has been determined to be impassable for the vehicle 1 (corresponding to a guidance element indicating that the road is impassable, as described in the claims). Consequently, the driver can make a visual confirmation that the left lane r1 is impassable for the vehicle 1 and the vehicle 1 can be prevented from traveling on the impassable left lane r1. Note that, the guidance display F that indicates that the lane is impassable may be displayed as an overlapped guidance display of an arrow and an X symbol, and the same effect as that described above can still be achieved.

Embodiment 4

Next, Embodiment 4 will be described.

A driving operation support device of a vehicle 1 according to Embodiment 4 has a system of Embodiment 3, and includes a navigation system 15 similar to Embodiment 2 (Refer to FIG. 11). Accordingly, an ECU 30 of this embodiment performs a partially different control than that of Embodiment 3.

The ECU 30 performs a predetermined calculation based on road information inputted from the navigation system 15 in addition to various signals inputted from a speed sensor 11, a yaw rate sensor 12, a camera 13, and a radar 14. The ECU 30 generates a laser control signal according to the results of the calculation and outputs this laser control signal to laser 22.

Figure 17:
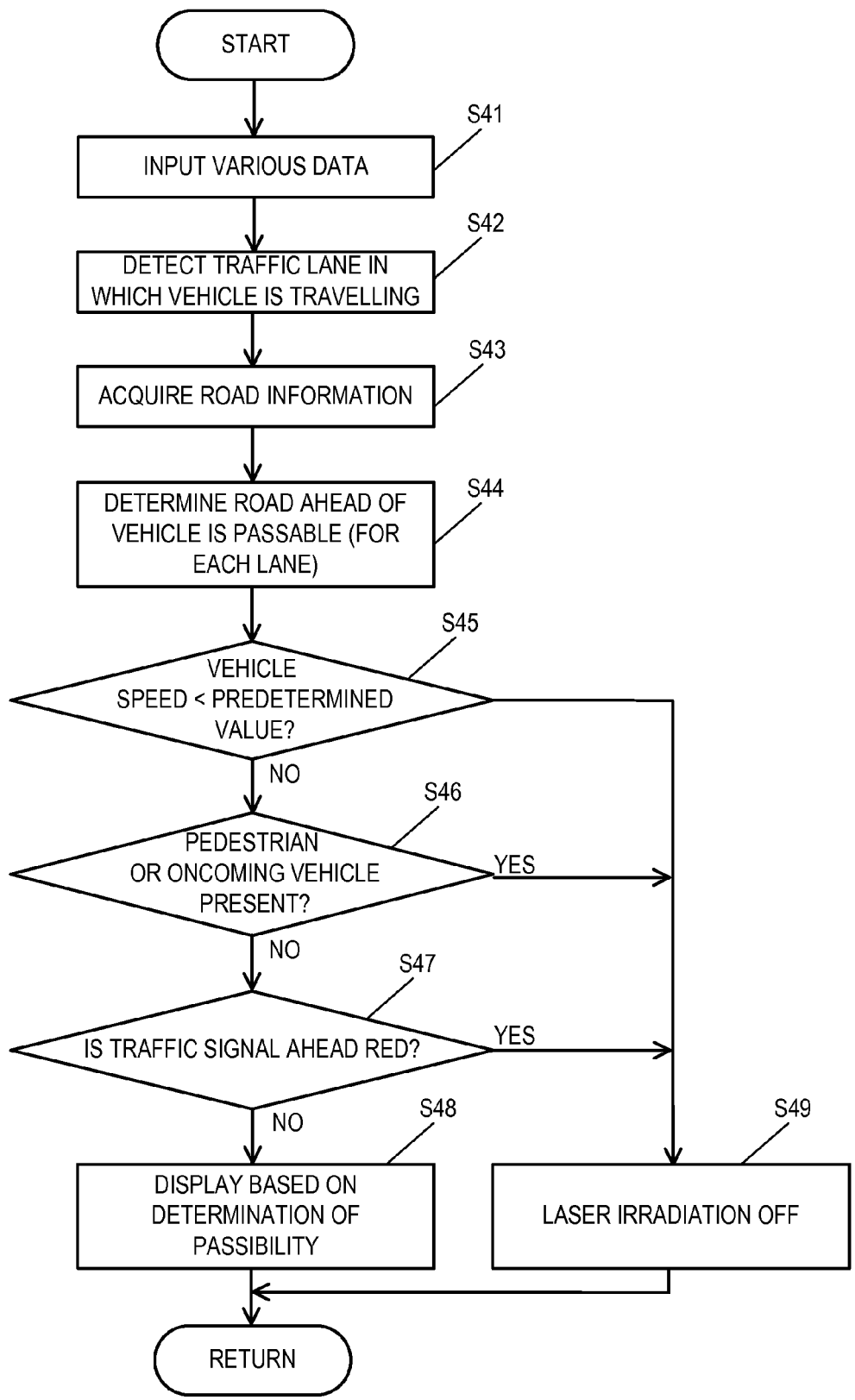
FIG. 17 is a flowchart showing an example control by the driving operation support device according to Embodiment 4 of the invention.

Next, a specific example operation of the driving operation support device of the vehicle 1 of this embodiment will be described according to a flowchart of FIG. 17. Note that a control according to this flowchart is repeatedly executed for every predetermined period.

Note that in step S41 to step S44, a control similar to step S21 to step S24 of Embodiment 2 is performed. Then, in step S45 to step S49, a control similar to step S35 to step S39 of Embodiment 3 is performed.

Next, several example patterns will be described regarding the guidance display of Embodiment 4.

Figure 18:
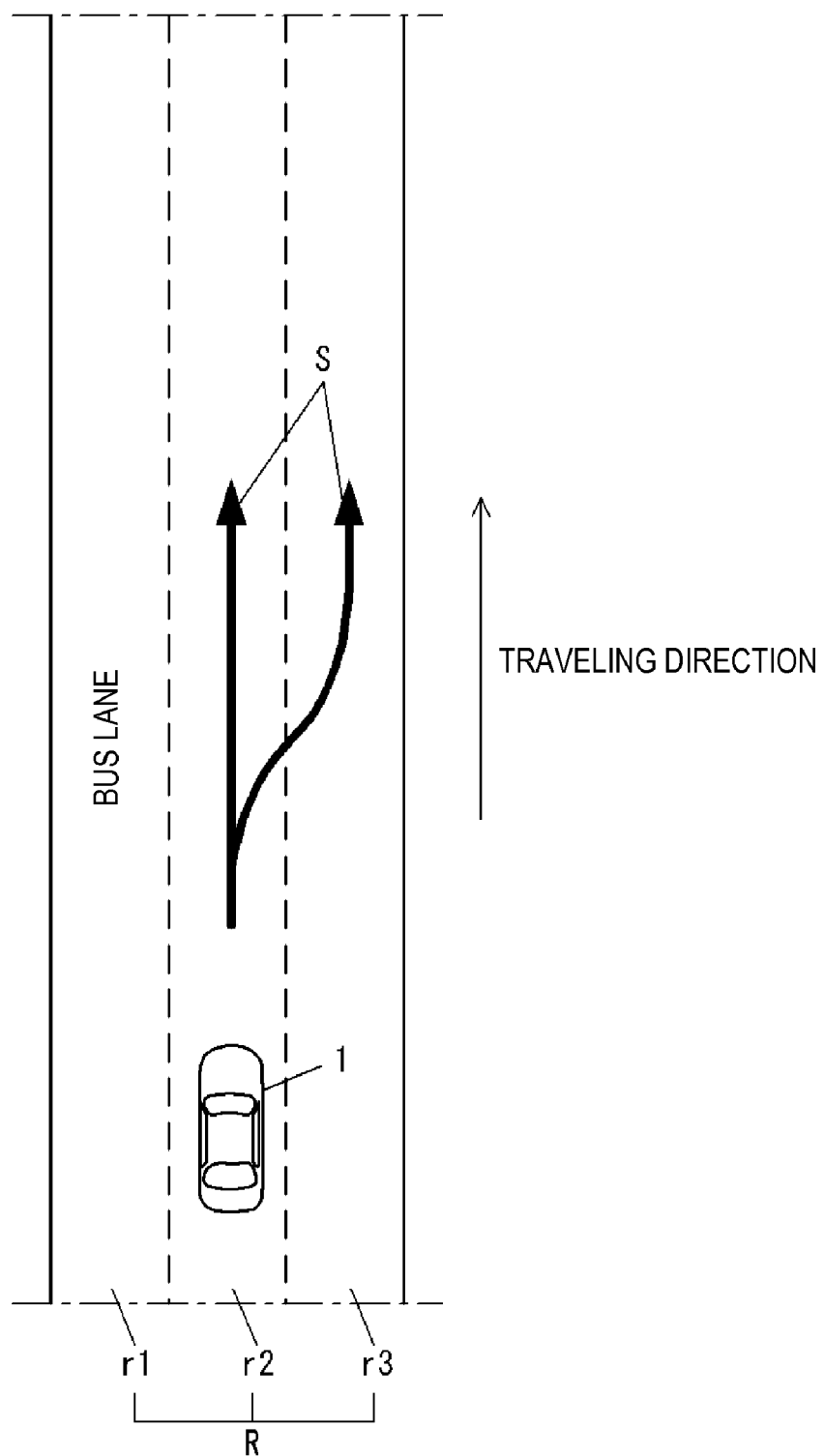
FIG. 18 is a schematic diagram illustrating a ninth display example of the driving operation support device.

For example, as shown in FIG. 8 described above (assuming that the vehicle 1 is not a bus), it is assumed that when the vehicle 1 is traveling in a central lane r2 of a road R having three lanes, an immediate left lane r1 is a bus lane and it is determined that the lane is impassable from the fact that the current time is within a time period of traffic regulation allowing only bus travel. In addition, it is assumed that there are no traffic regulations regarding the central lane r2 in which the vehicle 1 is currently traveling and the immediate right lane r3, and it is determined that the lanes are passable for the vehicle 1. In this case, as shown in FIG. 18, by irradiating the road surface of the road R with a visible light beam using the laser 22, a guidance display S configured using arrows is displayed only for the central lane r2 and the immediate right lane r3 (corresponding to a guidance element indicating that the road is passable, as described in the claims). Consequently, since there is no guidance display S for the immediate left lane r1, a driver will be able to understand that the left lane r1 is impassable for the vehicle 1 and the vehicle 1 can be prevented from traveling on the impassable left lane r1.

Note that a guidance display in this Embodiment 4 may be displayed as shown in FIGS. 13 to 16 described above with respect to Embodiment 3 and the same effect can be achieved.

Figure 19:
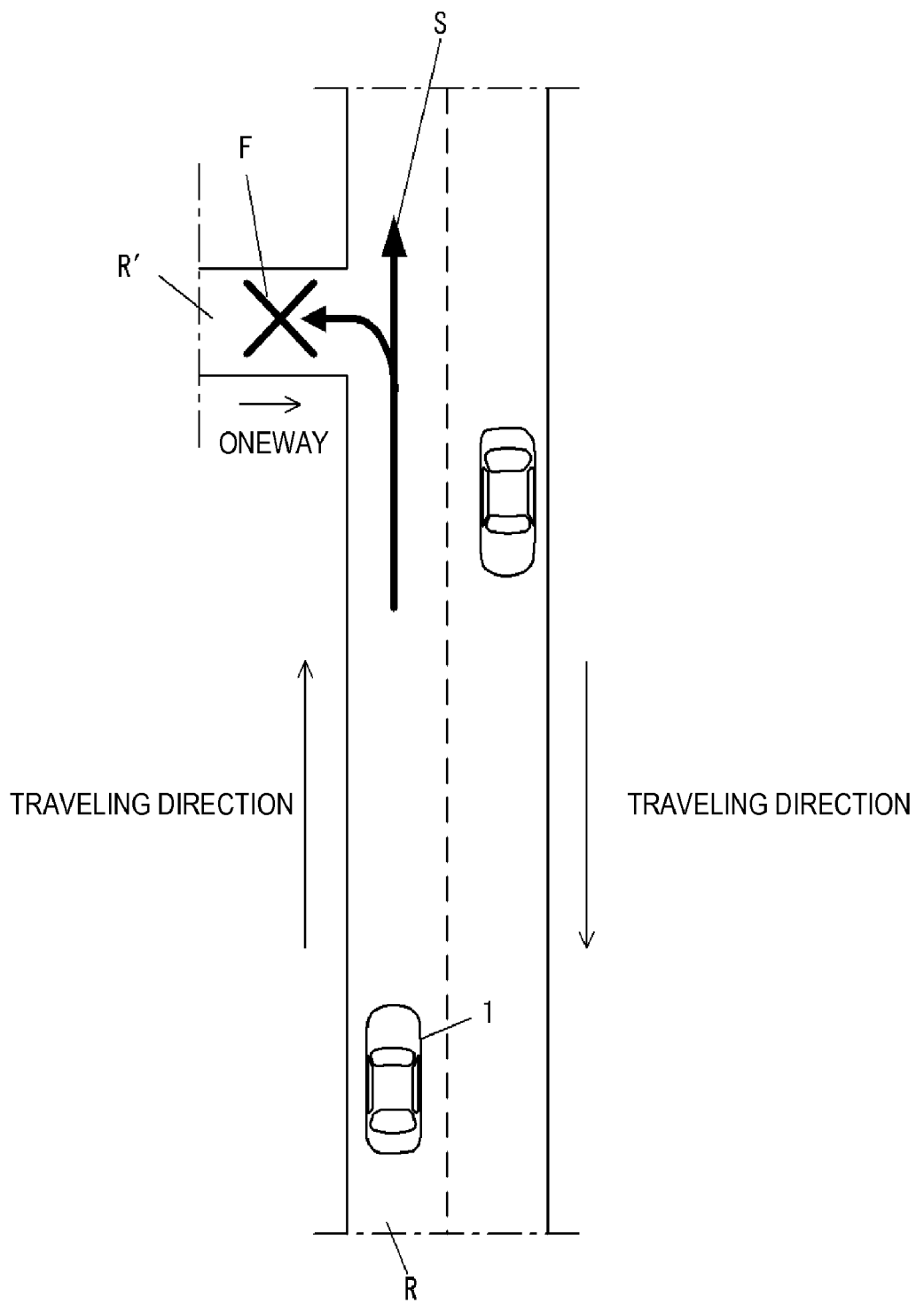
FIG. 19 is a schematic diagram illustrating a tenth display example of the driving operation support device.

Further, for example, as shown in FIG. 19, it is assumed that when the vehicle 1 is traveling on a road R having one lane on one side, a one-way road R' (that is, a road that permits travel only in a direction opposite to the traveling direction of the vehicle 1) intersecting with road R ahead of the vehicle 1 is detected within a predetermined distance from the vehicle 1, and the one-way road R' is determined to be impassable for the vehicle 1, and the road R over which the vehicle 1 is currently traveling (which is not a road that permits traveling only in a direction opposite to the traveling direction of the vehicle 1) is determined to be passable for the vehicle 1. In this case, as shown in FIG. 19, by irradiating the road surface of the road R with a visible light beam using the laser 22, a guidance display S, configured using an arrow, is displayed regarding the road R that has been determined to be passable for the vehicle 1 (corresponding to a guidance element indicating that the road is passable, as described in the claims). Meanwhile, another guidance display F configured using an arrow and an X symbol provided at the tip of the arrow is displayed for the one-way road R' that has been determined to be impassable for the vehicle 1 (corresponding to a guidance element indicating that the road is impassable, as described in the claims). Consequently, since the guidance display F indicates that it is not possible to travel on the road R' that is branching from the road R on which the vehicle 1 is currently traveling, a driver will be able to understand that the road R' is a 'no entry' road and is impassable; hence, it may be possible to prevent the vehicle 1 from accidentally entering the one-way road R'.

As described above, according to Embodiments 1 to 4 of the invention, information regarding the road over which the vehicle 1 is traveling (road information and object information) can be acquired using the camera 13, the radar 14, and the navigation system 15 (road sensors), and based on the road information acquired from the road sensors, the ECU 30

(controller) determines whether the road is passable for the vehicle 1. When the ECU determines that the road is passable, the ECU 30 causes the head up display 21 and the laser 22 to display a guidance display S at a position overlapped with the road as seen from the perspective of the driver, or the guidance display S may be displayed directly on the road. That is, the guidance display S indicates that the road is passable, and when the road is determined to be impassable, the guidance display S will not be displayed. Consequently, the driver will be able to understand easily whether the road is passable for the vehicle 1, and the vehicle 1 can be prevented from traveling the impassable road. Especially at night or in the rain, even when the visibility ahead of the vehicle 1 is bad, the driver of the vehicle 1 can comprehend easily that the road is passable or not and this thereby contributes to road safety.

Further, when the ECU 30 (controller) determines that the road is impassable, the guidance display F may be displayed at a position overlapped with the road seen from the perspective of the driver, or directly on the road. In this case, the driver can make a visual confirmation that the road is impassable for the vehicle 1.

Further, if the road has a plurality of lanes, information regarding each lane is acquired using the camera 13, the radar 14, and the navigation system 15 (road sensors), and based on the road information acquired from the road sensors, it is determined whether each lane is passable for the vehicle 1. Then, based on the determination, the guidance display S is displayed in such a way that a passable lane for the vehicle 1 is distinguishable by the driver from an impassable lane. Consequently, even if the road includes a passable lane and an impassable lane for the vehicle 1, the driver can easily recognize this situation, and the vehicle 1 can be prevented from entering into and traveling in the impassable lane.

Further, in Embodiments 1 and 3, for information regarding the road, the presence of an object on the road ahead of the vehicle 1 is detected using the camera 13 and the radar 14 (road sensors), and it is possible to display a guidance regarding the present condition of the road based on information which is unavailable from maps and the like.

Further, in Embodiments 2 and 4, for information regarding the road, since the road information can be acquired from the navigation system 15 (road information storage medium) installed in the vehicle 1 based on the positional information of the vehicle 1, it is possible to reliably display a guidance element complying with the traffic regulations of the road ahead of the vehicle 1.

Note that, in Embodiments 2 and 4, the guidance is displayed based on the road information stored in the storage module. However, for example, when the navigation system 15 is capable of receiving a radio wave from a beacon of a road traffic information system (such as VICS® (in service within Japan), ATIS (Advanced Traveler Information System), etc.), a guidance element may also be displayed based on this received information (road information supplied from the external system). Thus, it is possible to display a guidance element corresponding to the traffic regulations during a local emergency, such as a traffic accident, etc.

Further, by carrying out both the detection of the object described in Embodiments 1 and 3 and the acquisition of the road traffic information in Embodiments 2 and 4, a guidance element based on both types of road information may be displayed, and, thus, can achieve the effects from Embodiments 1 and 3 and the effects from Embodiments 2 and 4.

Further, in Embodiments 1 and 2, the guidance display S that indicates a road is passable, and the guidance display F that indicates a road is impassable are displayed using the head up display 21 on the front windshield 2 of the vehicle 1. Therefore, it is possible for a driver to naturally see the guidance display S and the guidance display F without changing his/her line of sight while driving the vehicle 1 and looking to the front of the vehicle.

Further, in Embodiments 3 and 4, the guidance display S that indicates a road is passable, and the guidance display F that indicates a road is impassable are displayed by irradiating the visible light beam on the road surface. Therefore, it is possible for a driver to naturally see the guidance displays without changing his/her line of sight while driving the vehicle 1 and looking to the front of the vehicle.

Further, in a case where the visible light beam is irradiated as described above, when a speed of the vehicle 1 is below the predetermined speed, for example, when the vehicle 1 stops or is about to stop at an intersection, the guidance display using the visible light beam is stopped from being displayed. Consequently, the displeasure experienced by a pedestrian crossing the intersection or a driver in an oncoming vehicle, caused by irradiation of the visible light beam, can be prevented.

Further, in a case where the visible light beam is irradiated as described above, when a pedestrian or an oncoming vehicle has been detected ahead of the vehicle 1, the guidance display using the visible light beam is stopped. Consequently, displeasure of the pedestrian or the driver in the oncoming vehicle caused by irradiation of the visible light beam, can be prevented. Note that stopping the guidance display using the visible light beam may be performed by completely stopping the guidance display using the visible light beam from being displayed, or it may also be performed by stopping the guidance display from being displayed only in the direction of the pedestrian or the oncoming vehicle.

Note that, in Embodiments 1 and 2, the display similar to that on the front windshield 2 using the head up display 21 may be performed on a screen of a display module of the navigation system 15. Therefore, even without providing the head up display 21, the guidance display can easily be displayed.

Furthermore, the invention is not limited to Embodiments 1 to 4 and modifications to the shapes of various types of the guidance display S and the guidance display F indicating that the road is impassable may be made without departing from the scope of the invention.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A driving operation support device for a vehicle comprising:
   a road sensor for acquiring information regarding a section of road ahead of a vehicle, over which the vehicle is traveling;
   a controller for determining whether the section of road is passable for the vehicle based on the information acquired by the road sensor; and
   a display provided between the section of road and a driver of the vehicle;
   wherein the controller displays a guidance element on the display at a position overlapped with the section of road as seen from a perspective of the driver, the guidance element indicating whether the section of road is passable based on the determination of the controller, and when the controller has determined the section of road to be impassable the guidance element indicates that the section of road is impassable via an arrow and a symbol positioned on the arrow indicating that the section of road is impassable.

2. A driving operation support device according to claim 1, wherein the guidance element indicates that the section of road is passable when the controller has determined the section of road to be passable.

3. A driving operation support device according to claim 1, wherein the road sensor acquires information regarding each of a plurality of lanes of the section of road,
the controller determines whether each lane is passable for the vehicle based on the information acquired by the road sensor, and
the controller causes a guidance element to be displayed in a manner that a passable lane for the vehicle is distinguishable from an impassable lane for the vehicle based on the controller determination of whether or not each lane is passable for the vehicle.

4. A driving operation support device according to claim 1, wherein
the road sensor acquires the information regarding the section of road from a memory provided inside or outside the vehicle, based on a current position of the vehicle.

5. A driving operation support device according to claim 1, wherein
the road sensor detects that an object is present on the section of road ahead of the vehicle as the information regarding the section of road.

6. A driving operation support device according to claim 1, wherein the display is provided on a front windshield of the vehicle.

7. A driving operation support device for a vehicle comprising:
a road sensor for acquiring information regarding a section of road ahead of a vehicle over which the vehicle is traveling;
a controller for determining whether the section of road is passable for the vehicle based on the information acquired by the road sensor; and
an irradiator for irradiating a visible light beam on the section of road;
wherein the controller causes the irradiator to display a guidance element on the section of road by irradiating the visible light beam, the guidance element indicating whether the section of road is passable based on the determination of the controller and where the guidance element displayed by irradiating the visible light beam indicates that the section of road is impassable when the controller has determined the section of road to be impassable via an arrow and an object projected on the section of road.

8. A driving operation support device according to claim 7, wherein the guidance element displayed by irradiating the visible light beam indicates that the section of road is passable when the controller has determined the section of road to be passable.

9. A driving operation support device according to claim 7, wherein the road sensor acquires information regarding each of a plurality of lanes of the section of road, and the controller determines whether each lane is passable for the vehicle based on the information acquired by the road sensor, and
the controller causes a guidance element to be displayed in a manner that a passable lane for the vehicle is distinguishable from an impassable lane for the vehicle based on the controller determination of whether or not each lane is passable for the vehicle.

10. A driving operation support device according to claim 7, wherein
the road sensor acquires the information regarding the section of road from a memory provided inside or outside the vehicle, based on a current position of the vehicle.

11. A driving operation support device according to claim 7, wherein
the road sensor detects that an object is present on the section of road ahead of the vehicle as the information regarding the road.

12. A driving operation support device according to claim 7, further comprising a speed sensor for detecting a traveling speed of the vehicle, wherein
the controller stops displaying the guidance element using the visible light beam, when the traveling speed detected by the speed sensor is below a predetermined speed.

13. A driving operation support device according to claim 7, further comprising an object sensor for detecting at least one of a pedestrian and an oncoming vehicle that is present on the section of road ahead of the vehicle,
wherein the controller stops displaying the guidance element using the visible light beam, when at least one of the pedestrian and the oncoming vehicle is detected by the object sensor.

* * * * *

UNITED STATES PATENT AND TRADEMARK OFFICE
CERTIFICATE OF CORRECTION

| | | |
|---|---|---|
| PATENT NO. | : 8,224,522 B2 | Page 1 of 1 |
| APPLICATION NO. | : 12/483120 | |
| DATED | : July 17, 2012 | |
| INVENTOR(S) | : Kenichi Ikeda et al. | |

It is certified that error appears in the above-identified patent and that said Letters Patent is hereby corrected as shown below:

On the Title page:

In Item (75): Inventors:

On Line 4, delete "Kazuhiro" and insert --Kazuhito-- therefor.

Signed and Sealed this
Eighteenth Day of September, 2012

David J. Kappos
*Director of the United States Patent and Trademark Office*